(12) United States Patent
Valtchev

(10) Patent No.: US 10,922,099 B2
(45) Date of Patent: Feb. 16, 2021

(54) METHODS FOR USER INTERFACE GENERATION AND APPLICATION MODIFICATION

(71) Applicant: Versata FZ-LLC, Dubai Media (AE)

(72) Inventor: Plamen Ivanov Valtchev, London (GB)

(73) Assignee: VERSATA FZ-LLC, Austin, TX (US)

(*) Notice: Subject to any disclaimer, the term of this patent is extended or adjusted under 35 U.S.C. 154(b) by 0 days.

(21) Appl. No.: 15/204,063

(22) Filed: Jul. 7, 2016

(65) Prior Publication Data

US 2016/0321044 A1 Nov. 3, 2016

Related U.S. Application Data

(62) Division of application No. 12/064,598, filed as application No. PCT/GB2006/002985 on Aug. 9, 2006.

(Continued)

(30) Foreign Application Priority Data

Aug. 25, 2005 (GB) .................................. 0517357

(51) Int. Cl.
*G06F 9/445* (2018.01)
*G06F 8/30* (2018.01)
(Continued)

(52) U.S. Cl.
CPC .............. *G06F 9/451* (2018.02); *G06F 3/048* (2013.01); *G06F 3/0481* (2013.01);
(Continued)

(58) Field of Classification Search
CPC ..... G06F 8/30; G06F 8/33; G06F 8/34; G06F 8/35; G06F 8/38; G06F 8/54; G06F 8/65;
(Continued)

(56) References Cited

U.S. PATENT DOCUMENTS 6,546,553 B1 * 4/2003 Hunt ....................... G06F 9/443
712/233
6,769,117 B2 * 7/2004 Moore ................ G06F 9/44521
709/230

(Continued)

FOREIGN PATENT DOCUMENTS

WO 20070232552 A1 3/2007

OTHER PUBLICATIONS

Final Office Action dated Sep. 15, 2016, mailed in U.S. Appl. No. 12/064,598, pp. 1-21.

(Continued)

*Primary Examiner* — Charles M Swift

(57) ABSTRACT

A method of generating a user interface for presentation to a user. The method comprises executing a first application computer program to provide a user interface, executing agent computer program code to interrogate and modify said user interface during execution of said first application computer program, and presenting said modified user interface. The first application computer program may be run on a server, while the modified user interface may be presented to a user at a client connected to said server.

11 Claims, 36 Drawing Sheets

Related U.S. Application Data

(60) Provisional application No. 60/750,133, filed on Dec. 14, 2005.

(51) Int. Cl.

| G06F 3/048 | (2013.01) |
| --- | --- |
| G06F 3/0481 | (2013.01) |
| G06F 9/451 | (2018.01) |
| G06F 3/0482 | (2013.01) |
| G06F 8/35 | (2018.01) |
| G06F 8/34 | (2018.01) |
| G06F 8/38 | (2018.01) |
| G06F 8/65 | (2018.01) |
| G06F 8/33 | (2018.01) |
| G06F 9/455 | (2018.01) |
| G06F 8/54 | (2018.01) |
| G06F 9/54 | (2006.01) |

(52) U.S. Cl.
CPC ............. *G06F 3/0482* (2013.01); *G06F 8/30* (2013.01); *G06F 8/33* (2013.01); *G06F 8/34* (2013.01); *G06F 8/35* (2013.01); *G06F 8/38* (2013.01); *G06F 8/54* (2013.01); *G06F 8/65* (2013.01); *G06F 9/454* (2018.02); *G06F 9/45508* (2013.01); *G06F 9/45516* (2013.01); *G06F 9/542* (2013.01); *G06F 2209/541* (2013.01); *G06F 2209/545* (2013.01)

(58) Field of Classification Search
CPC .... G06F 8/67; G06F 9/45508; G06F 9/45516; G06F 9/4443; G06F 9/4448; G06F 3/048; G06F 3/0481; G06F 3/0482
See application file for complete search history.

(56) References Cited

U.S. PATENT DOCUMENTS

| 7,024,365 | B1* | 4/2006 | Koff ........................ G06F 9/454 704/270.1 |
| --- | --- | --- | --- |
| 7,043,697 | B1* | 5/2006 | Jensen .................. G06F 9/4411 715/778 |
| 7,055,146 | B1* | 5/2006 | Durr .................... G06F 9/44521 717/162 |
| 7,590,724 | B1* | 9/2009 | Williams ............... G06Q 30/02 709/203 |
| 7,793,272 | B2* | 9/2010 | Andrews ............. G06F 9/45516 717/127 |
| 8,091,076 | B2* | 1/2012 | Brown ..................... G06F 8/52 717/136 |
| 8,225,328 | B2* | 7/2012 | Sigurdsson ............. G06F 9/443 719/311 |
| 8,504,930 | B1* | 8/2013 | Chansler ................... G06F 8/38 707/713 |
| 2002/0033838 | A1* | 3/2002 | Krueger .............. G06F 9/44521 715/700 |
| 2002/0052981 | A1* | 5/2002 | Yasuda ................. G06F 3/0482 719/320 |
| 2002/0054092 | A1* | 5/2002 | Hedloy ................. G06F 17/276 715/748 |
| 2002/0091510 | A1* | 7/2002 | Forrest .................. G06F 9/4448 704/8 |
| 2002/0149629 | A1* | 10/2002 | Craycroft ............. G06F 9/4443 715/861 |
| 2003/0063119 | A1* | 4/2003 | Bloomfield ........... G06F 9/4445 715/738 |
| 2003/0184587 | A1* | 10/2003 | Ording ................ G06F 3/04817 715/769 |
| 2003/0204590 | A1* | 10/2003 | Torii .................. H04L 41/0213 709/224 |
| 2003/0236986 | A1* | 12/2003 | Cronce .................... G06F 21/14 713/189 |
| 2004/0098707 | A1* | 5/2004 | Tang .................... G06F 11/3624 717/130 |
| 2004/0153825 | A1* | 8/2004 | Morimoto ........... G06F 11/3624 714/38.13 |
| 2004/0163077 | A1* | 8/2004 | Dimpsey ............. G06F 11/3466 717/130 |
| 2005/0138643 | A1* | 6/2005 | Jaeger ................. G06F 9/45508 719/320 |
| 2006/0059430 | A1* | 3/2006 | Bells ..................... G06F 3/0484 715/747 |
| 2006/0095895 | A1* | 5/2006 | K ............................ G06F 11/28 717/130 |
| 2006/0288335 | A1* | 12/2006 | Goglin .................... G06F 8/456 717/130 |
| 2007/0113189 | A1* | 5/2007 | Ramani ................. G06F 9/4443 715/746 |
| 2007/0118489 | A1* | 5/2007 | Gleason .............. G06F 17/2775 706/6 |

OTHER PUBLICATIONS

Decision to Refuse dated Jan. 2, 2017, mailed by the European Patent Office in European Patent Application No. 10012512.9, pp. 1-12.

Summons to Attend Oral Proceedings Jul. 15, 2016, mailed by the European Patent Office in European Patent Application No. 10012512.9, pp. 1-6.

Summons to Attend Oral Proceedings Jul. 15, 2016, mailed by the European Patent Office in European Patent Application No. 10012511.1, pp. 1-6.

Non-Final Office Action dated Mar. 30, 2016, mailed in U.S. Appl. No. 12/064,598, pp. 1-39.

Request for Continued Examination (RCE) and RCE Submission as filed in U.S. Appl. No. 12/064,598 on Mar. 17, 2016, pp. 1-18.

Advisory Action dated Mar. 3, 2016, mailed in U.S. Appl. No. 12/064,598, pp. 1-6.

Response to Final Office Action dated Sep. 17, 2015, as filed in U.S. Appl. No. 12/064,598 dated Feb. 17, 2016, pp. 1-14.

Response to Non-Final Office Action dated Mar. 19, 2015, as filed in U.S. Appl. No. 12/064,598 dated Aug. 19, 2015, pp. 1-14.

Non-Final Office Action dated Mar. 19, 2015, mailed in U.S. Appl. No. 12/064,598, pp. 1-30.

Request for Continued Examination (RCE) and RCE Submission as filed in U.S. Appl. No. 12/064,598 on Feb. 17, 2015, pp. 1-16.

Advisory Action dated in U.S. Appl. No. 12/064,598 dated Feb. 3, 2015, pp. 1-9.

Response to Final Office Action dated Aug. 14, 2014, as filed in U.S. Appl. No. 12/064,598 dated Jan. 14, 2015, pp. 1-13.

Final Office Action dated Aug. 14, 2014, mailed in U.S. Appl. No. 12/064,598, pp. 1-29.

Response to Non-Final Office Action dated Jan. 7, 2014, as filed in U.S. Appl. No. 12/064,598 dated Jul. 7, 2014, pp. 1-14.

Non-Final Office Action dated Jan. 7, 2014, mailed in U.S. Appl. No. 12/064,598, pp. 1-28.

Request for Continued Examination (RCE) and the RCE submission, as filed in U.S. Appl. No. 12/064,598 on Nov. 21, 2013, pp. 1-15.

Final Office Action dated May 21, 2013, mailed in U.S. Appl. No. 12/064,598, pp. 1-23.

Response to Non-Final Office Action dated Nov. 23, 2012, as filed in U.S. Appl. No. 12/064,598 dated Apr. 23, 2013, pp. 1-12.

Non-Final Office Action dated Nov. 23, 2012, mailed in U.S. Appl. No. 12/064,598, pp. 1-56.

Final Office Action dated Sep. 17, 2015, mailed in U.S. Appl. No. 12/064,598, pp. 1-24.

Grounds of Appeal against a decision of the Examining Division dated Jan. 2, 2017, as filed in European Patent Application No. 10012512.9 on May 12, 2017, pp. 1-14.

Response to Final Office Action dated Sep. 15, 2016, as filed in U.S. Appl. No. 12/064,598 dated Feb. 15, 2017, pp. 1-15.

Request for Continued Examination (RCE) and RCE Submission as filed in U.S. Appl. No. 12/064,598 on Mar. 15, 2017, pp. 1-18.

(56) References Cited

OTHER PUBLICATIONS

Non-Final Office Action dated Mar. 29, 2017, mailed in U.S. Appl. No. 12/064,598, pp. 1-21.
Response to Non-Final Office Action dated Mar. 29, 2017, as filed in U.S. Appl. No. 12/064,598 dated Aug. 29, 2017, pp. 1-17.
Request for Continued Examination (RCE) and RCE Submission as filed in U.S. Appl. No. 12/064,598 on Mar. 22, 2018, pp. 1-20.
Advisory Action dated Mar. 8, 2018, mailed in U.S. Appl. No. 12/064,598 on, pp. 1-3.
Response to Final Office Action dated Sep. 22, 2017, as filed in U.S. Appl. No. 12/064,598 dated Feb. 22, 2018, pp. 1-17.
Final Office Action dated Sep. 22, 2017, mailed in U.S. Appl. No. 12/064,598, pp. 1-25.
Communication Pursuant to Article 94(3) EPC dated Dec. 21, 2017, mailed in European Patent Application No. 10012513.7, pp. 1-4.
Summons to Attend Oral Proceedings pursuant to Rule 115(1) EPC dated Mar. 19, 2018, mailed in European Patent Application No. 10012512.9, pp. 1-10.
Communication of Intention to Grant under Rule 71(3) dated Nov. 17, 2017, mailed in European Patent Application No. 10012514.5, pp. 1-7.
Response to Communication of Intention to Grant under Rule 71(3) dated Nov. 17, 2017, as filed in European Patent Application No. 10012514.5 dated Mar. 20, 2018, pp. 1-2.
Second Auxiliary Request in Response to the Summons to Attend Oral Proceedings pursuant to Rule 115(1) EPC dated Mar. 19, 2018, as filed in European Patent Application No. 10012512.9 on Sep. 3, 2018, pp. 1-9.
Decision from the Board of Appeals dated Oct. 10, 2018, mailed in European Patent Application No. 10012512.9 on Nov. 9, 2018, pp. 1-18.
Response to the Examination Report dated Dec. 21, 2017, as filed in European Patent Application No. 10012513.7 dated Oct. 5, 2018, pp. 1-5.
Notice of Allowance dated Sep. 25, 2018, mailed in U.S. Appl. No. 12/064,598, pp. 1-11.
Decision to Grant a European Patent pursuant to Article 97(1) EPC, issued in the corresponding European Patent Application No. 10012514.5, dated Apr. 26, 2018, pp. 1-2.
EPO Communication regarding Expiration of Time Limit for Notice of Opposition dated Mar. 29, 2019 issued in the corresponding European Patent Applicatin No. 10012514.5, p. 1.
Notice of Appeal in European Patent Application No. 10012512.9 dated Mar. 10, 2017, p. 1.
Decision to Refuse dated May 6, 2013, mailed by the EPO in European Patent Application No. 06779109.5, pp. 1-19.
EPO communication pursuant to Article 94(3) EPC in European Patent Application No. 10012514.5 dated Sep. 23, 2013, pp. 1-5.
EPO Communication pursuant to Article 94(3) EPC regarding an Examination Report in European Patent Application No. 10012514.5 dated Oct. 8, 2015, pp. 1-4.
Written Submission dated Nov. 16, 2016 in Response to the Summons to Oral Proceedings dated Dec. 16, 2016, as filed in Patent Application No. 10012512.9 pp. 1-3.
EPO Communication dated Apr. 11, 2017 regarding correction in corresponding European Patent Application No. 10012511.1, pp. 1-2.
Response dated Jun. 26, 2018 to EPO Communication dated Dec. 21, 2017 in corresponding European Patent Application No. 10012513.7, pp. 1-2.
Response dated Mar. 20, 2018 to EPO Communication dated Mar. 20, 2018 in corresponding European Patent Application No. 10012514.5, p. 1.
EPO Communication dated Jul. 27, 2018 Noting of Loss of Rights pursuant to Rule 112(1) EPC in corresponding European Patent Application No. 10012513.7, p. 1-2.

* cited by examiner

```
58
      77D6148B 8B FF              mov     edi,edi
59    77D6148D 55                 push    ebp
      77D6148E 8B EC              mov     ebp,esp
60    77D61490 8B 4D 08           mov     ecx,dword ptr [ebp+8]
      77D61493 E8 38 70 FE FF     call    77D484D0
63    77D61498 85 C0              test    eax,eax
      77D6149A 0F 84 1A E7 FF FF  je      77D5FBBA
      77D614A0 8A 48 23           mov     cl,byte ptr [eax+23h]
      77D614A3 80 E1 C0           and     cl,0C0h
      77D614A6 80 F9 40           cmp     cl,40h
      77D614A9 0F 84 12 E7 FF FF  je      77D5FBC1
       ....  ....
          54           55          56           57
```

```
03011FA8 8B FF              mov      edi,edi
03011FAA 55                 push     ebp
03011FAB 8B EC              mov      ebp,esp
03011FAD E9 DE F4 D4 74     jmp      77D61490
```

Fig 10

```
77D6148B E9 F0 56 E4 8A     jmp      02BA6B80
77D61490 8B 4D 08           mov      ecx,dword ptr [ebp+8]
77D61493 E8 38 70 FE FF     call     77D484D0
77D61498 85 C0              test     eax,eax
77D6149A 0F 84 1A E7 FF FF  je       77D5FBBA
77D614A0 8A 48 23           mov      cl,byte ptr [eax+23h]
77D614A3 80 E1 C0           and      cl,0C0h
77D614A6 80 F9 40           cmp      cl,40h
77D614A9 0F 84 12 E7 FF FF  je       77D5FBC1
............
```

Fig 11

```
02BA6B80 9C                 pushfd
02BA6B81 60                 pushad
02BA6B82 8D 44 24 24        lea      eax,[esp+24h]
02BA6B86 50                 push     eax
02BA6B87 68 01 00 00 00     push     1       // function id
02BA6B8C E8 DF A6 3D FF     call     LogCall (1F81270h)
02BA6B91 66 83 C4 08        add      sp,8
02BA6B95 61                 popad
02BA6B96 9D                 popfd
02BA6B97 E9 0C B4 46 00     jmp      03011FA8 // trampoline
```

METHODS FOR USER INTERFACE GENERATION AND APPLICATION MODIFICATION

The present invention relates to systems and methods for generating and modifying user interfaces. More particularly, but not exclusively, the invention relates to modifying a user interface provided by an application running on a server computer, and providing this modified user interface to a user using a client computer connected to that server computer. The invention further relates to methods for modifying an application.

Computers are now ubiquitous in modern society. They are used in many industries, and many occupations require users to spend large portions of a working day using various computer based applications. Typically, users are provided with user interfaces to such applications, the user interfaces being provided by application suppliers. Such user interfaces necessarily include a variety of different features, many of which will not be used by some users. Therefore, a user's productivity may be adversely affected given that a relatively complex user interface is used, when in fact a relatively simple interface could be used to carry out the same task more efficiently.

The problem is worsened when a computer user needs to use a plurality of different applications in order to complete a task allocated to them, each application having a separate user interface. Such a scenario is common in many occupations. Switching between the different user interfaces of the different applications in order to complete a given task degrades user efficiency yet further. It will often be the case that different applications are supplied by different vendors and accordingly their user interfaces have different "look and feel", thus further degrading user efficiency.

For example, in order to process customer enquiries, operators in a call centre may need to access a customer management application to access customer details, a billing application to access customer account information, and a payment application to process any payment which may be made by the customer over the telephone, for example by credit card. Working in this manner is inefficient, given that the operator is required to switch between applications in order to complete some tasks. Furthermore, a customer will typically remain on the telephone while the operator uses these different applications, and it is therefore advantageous to speed up the processing of enquires, in order to offer a higher quality customer service.

Various proposals have been made to enhance user efficiency when multiple applications need to be used.

The multiple applications can be combined into a single product or product suite. While such a proposal provides great increases in user efficiency, it is difficult and expensive to implement. Furthermore, such a combined product or product suite will typically have a different user interface from those used previously, therefore meaning that users need to be trained in use of the combined product, further increasing cost.

It has alternatively been proposed that the multiple applications can be combined in some way. For example, all requests can be passed to a single one of the applications, and this application can be adapted to forward requests to an appropriate source application. Such a solution typically requires considerable customisation if it is to work in under all circumstances that may routinely arise, making such a solution difficult to implement.

International patent application publication number WO2005/062175 describes various methods for user interface generation. Although such methods can effectively be used to allow combination of various user interfaces, they are in general terms intended for use with user interfaces provided in a plurality of files defined in the Hypertext Markup Language (HTML), which are presented to a user via a web browser.

Thus, there is a need for a generally applicable method for modifying and combining user interfaces so as to generate user interfaces for display to a user.

It is an object of the present invention to obviate or mitigate at least some of the problems set out above.

There is provided a method of modifying a source application. The method comprises running the source application and modifying computer program code associated with the source application at runtime. The modifying causes a link to be established between the source application and an interpreter. The interpreter interprets predetermined modification computer program code, the modification computer program code being configured to modify the source application.

Thus, it can be seen that a method is provided which allows desired modifications to be specified in a high level language susceptible of interpretation by the interpreter. This modification computer program code can then be used to modify source application behaviour. Thus, there is provided a framework which allows different modifications to be specified in a relatively straightforward manner, requiring only high level interpreted program code to be created, without the need to perform further modification to the source application. This obviates the need for details native code modifications.

The method provided is particularly suitable for modifying user interfaces.

There is also provided a method and apparatus for generating a user interface for presentation to a user. The method comprises executing a first application computer program to provide a user interface, and executing agent computer program code to modify the user interface during execution of the first application computer program. The modified user interface is then presented.

Thus, there is provided a method in which a user interface is modified at runtime during execution of an application computer program code. Thus, a source application provided by different vendor can be conveniently modified.

The method can be carried out on a standalone computer, or alternatively in a client-server environment. Indeed, the first application computer program may be executed on a server, and the server may be in communication with a client. The modified user interface may then be provided for presentation at the client. In preferred embodiments of the invention, the agent computer program code is executed at the server. The agent computer program code may provide the modified user interface to the client.

Executing the first application computer program may comprise creating an application process in which the application computer program is to execute, and creating a first thread within said application process to execute the computer program. A second thread may be created within the application process to execute the agent computer program code. That is, the agent computer program code may run within the same operating system process as the application computer program. Therefore, the application computer program and the agent may share operating system allocated resources.

The invention also provides a further method and apparatus for generating a user interface. This method comprises reading first program code defining the user interface, reading second program code defining at least one modification to the user interface, executing the first program ode within an operating system process having an associated memory space, and executing the second program code within the same operating system process to generate a modified user interface.

Executing the second computer program code may comprise executing computer program code configured to cause an interpreter to run within said operating system process, and commands interpreted using the interpreter may be used to modify the user interface.

The invention also provides a method and apparatus for affecting operation of a computer program. This method comprises causing further computer program code to execute within a memory space of the computer program. The further computer program code causes execution of an interpreter configured to interpret instructions to affect operation of the computer program. The instructions interpreted by the interpreter may include instructions configured to modify a user interface, although it will be appreciated that instructions causing other modifications may also be interpreted.

The invention yet further provides a method and apparatus for affecting operation of a user interface associated with a computer program, during execution of that computer program. The computer program has an associated memory space. The method comprises determining a memory location within the memory space at which predetermined computer program is stored. At least part of the predetermined program code is replaced with further predetermined program code, such that said user interface associated with the computer program is modified. The modification computer program code may be added to a memory space of said computer program.

The invention further provides a method and apparatus for affecting operation of a computer program. This method comprises associating an interpreter with the computer program, and affecting operation of the computer program by interpreting commands using the interpreter.

There is also provided a method of affecting the behaviour of a user interface comprising a plurality of user interface elements. This method comprises defining a model of the user interface using a plurality of communicating objects. The objects are preferably defined using an object orientated programming language. Each of these objects represents one of the user interface elements. Notification of an event based on activity within the user interface is received at one of the objects, and that notification is processed at that one of the objects, the processing causing behaviour of the user interface to be modified.

It will be appreciated that all aspects of the present invention can be implemented as methods and apparatus. Additionally, the methods provided by the invention may be implemented using appropriately programmed computers. Accordingly, aspects of the invention provide suitable computer programs as well as data carriers carrying such computer programs. The term data carrier is intended to include both tangible media as well as communications lines. The invention can also be implemented in a distributed fashion, and accordingly aspects of the present invention also cover suitably configured computer networks.

Embodiments of the present invention will now be described, by way of example, with reference to the accompanying drawings, in which:

FIG. 8 is a schematic illustration of blocks of computer program code used to affect application behaviour at runtime;

FIGS. 9 to 12 are illustrations of code fragments taken from the blocks of computer program code shown in FIG. 8;

FIGS. 25A to 25E are screenshots from a target application into which part of the source application has been incorporated;

Figure 1:
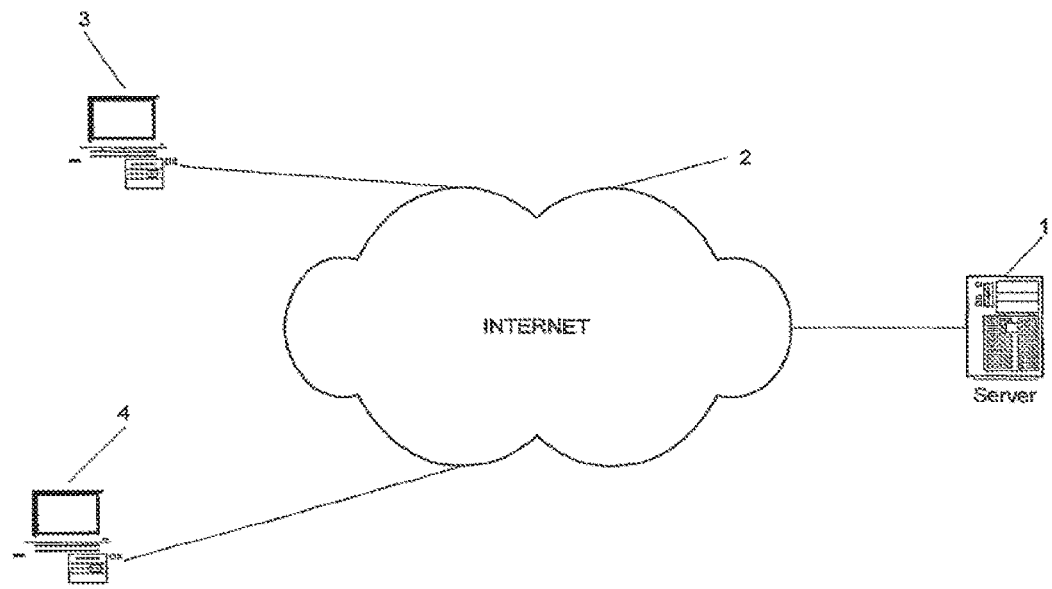
FIG. 1 is a schematic illustration of a network of computers suitable for implementing an embodiment of the present invention.

Referring first to FIG. 1, it can be seen that a server 1 is connected to the Internet 2. The server 1 is configured to run a plurality of source applications. These source applications can be accessed via the Internet 2 using PCs 3, 4. The PCs 3, 4 are provided with means for connection to the Internet 2. For example the PCs 3, 4, may be connected to the Internet 2 via a local area network, via ADSL links or via dial up connections using modems. It will be appreciated that although two PC's 3, 4 are shown in FIG. 1, in general terms any number of PC's can be used.

Figure 2:
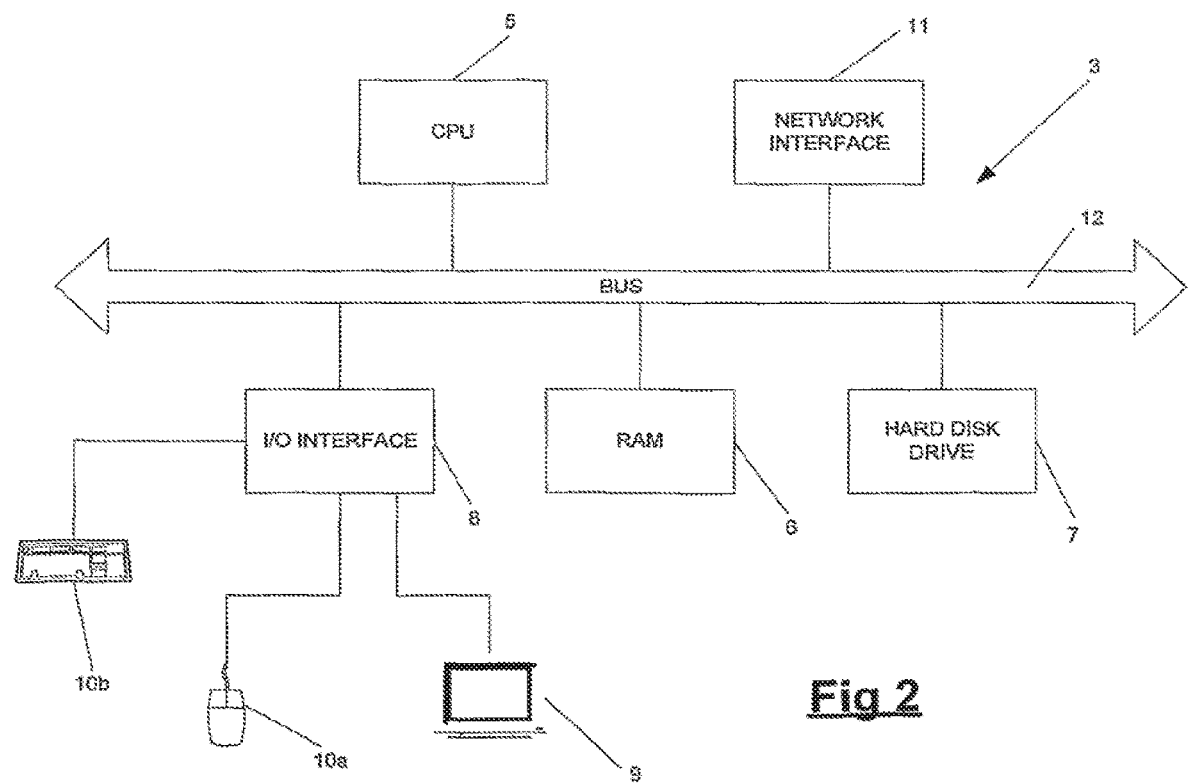
FIG. 2 is a schematic illustration of a computer of FIG. 1 in further detail.

FIG. 2 shows the structure of the PC 3 in further detail. It can be seen that the PC 3 comprises a CPU 5, and random access memory (RAM) 6 which in use provides volatile storage for both programs and data. The PC 3 further comprises non-volatile storage in the form of a hard disk drive 7. An input/output (I/O) interface 8 connects input and output devices to the PC 3. It can be seen that an output device in the form of a display screen 9 is connected to the I/O interface 8. It can also be seen that input devices comprising a mouse 10a and a keyboard 10b are connected to the I/O interface 8. The PC 3 further comprises a network interface 11 providing means to connect the PC 3 to a local area network. This link to the local area network can indirectly provide access to the Internet 2 as described above. The CPU 5, the RAM 6, the hard disk drive 7, the I/O interface 8 and the network interface 11 are all connected together by means of a communications bus 12.

As described above, the server 1 runs and provides access to source applications. The source applications have associated user interfaces, and these user interfaces (or parts of those interfaces) are displayed to users via the PCs 3, 4. In this way, a user of one of the PCs 3, 4 can remotely access source applications operating on the server 1 via the Internet 2.

Figure 3:
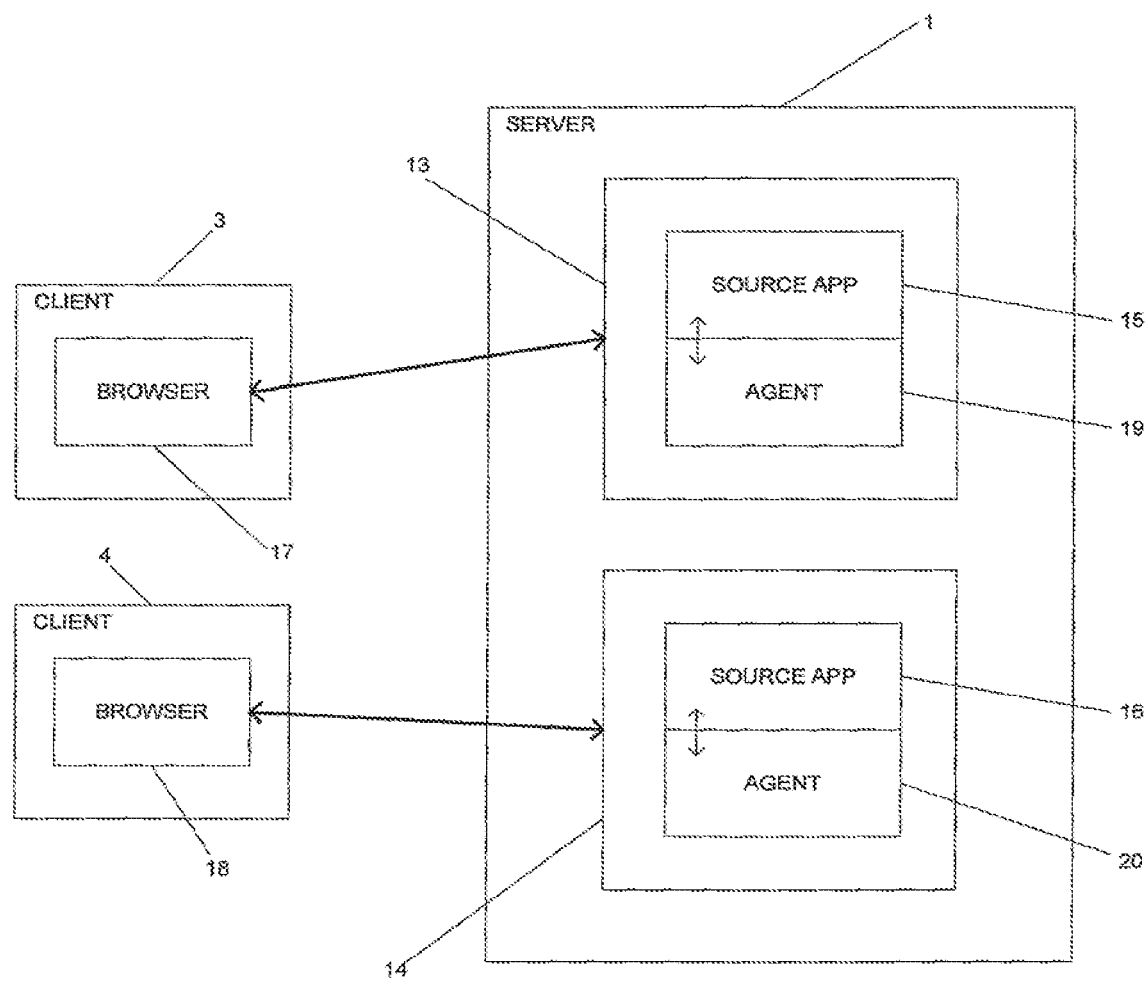
FIG. 3 is a schematic illustration showing components used to implement an embodiment of the present invention using the network of FIG. 1.

Referring to FIG. 3, it can be seen that the server 1 communicates with clients in the form of the PCs 3, 4. The server 1 provides two desktop sessions 13, 14. The desktop session 13 runs a first instance 15 of a source application, while the desktop session 14 runs a second instance 16 of the same source application. The desktop session 13 is accessed remotely by the PC 3, while the desktop session 14 is accessed remotely by the PC 4. Thus, users of the PCs 3, 4 are each provided with access to a discrete instance of the source application, a user of the PC 3 being provided with access to the first instance of the source application 15, while a user of the PC 4 is provided with access to the second instance of the source application 16.

The PCs 3, 4, each run a respective web browser application 17, 18 which is configured to access the user interface of the respective source application instance 15, 16. The web browser applications 17, 18, each communicate with a respective one of agents 19, 20 provided by the desktop sessions 13, 14 respectively. The agents 19, 20 communicate with the respective source application instances 15, 16 and provide user interface elements to the web browsers 17, 18 as is described in further detail below.

Figure 4:
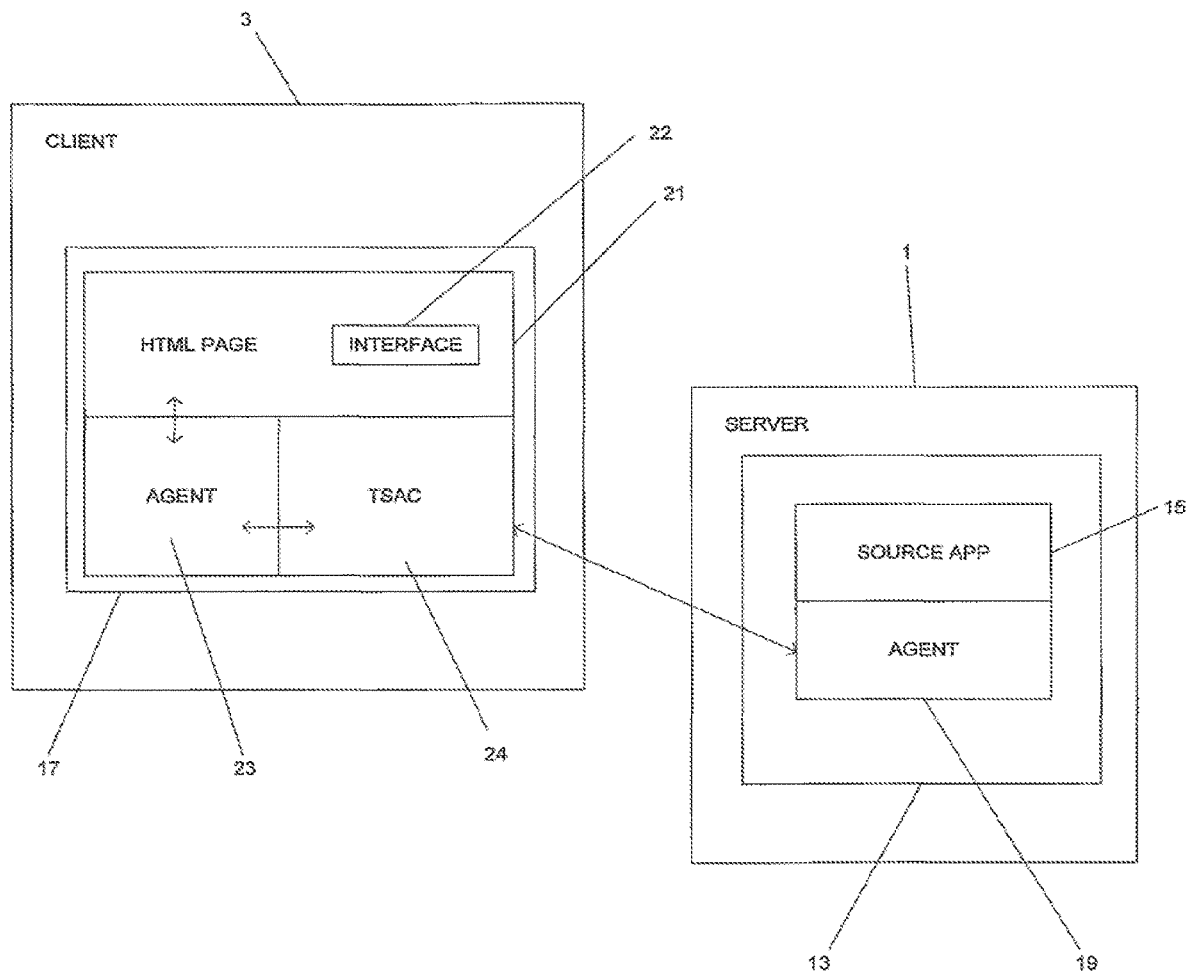
FIG. 4 is a schematic illustration showing part of the embodiment of FIG. 3 in further detail.

Referring now to FIG. 4, communication between the PC 3 acting as a client and the server 1 is described in further detail. As previously described it can be seen that the server 1 provides a desktop session 13 within which the source application instance 15 and its associated agent 19 run. The PC 3 runs the web browser application 17 as previously described. The web browser application 17 displays a HTML page 21 which includes user interface elements 22 taken from the interface of the source application instance 15. In order to provide those user interface elements, the HTML page 21 is controlled by a browser agent 23 comprising JavaScript code which runs within the web browser 17. The browser agent 23 in turn communicates with the agent 19 operating within the desktop session 13 on the server 1. Communication between the browser agent 23 and the agent 19 uses the remote desktop protocol (RDP). Communication is carried out via a terminal services application client (TSAC) 24 which runs within the web browser application 17. Operation of the components described with reference to FIG. 4 is described in further detail below. In further detail, in a preferred embodiment of the present invention, the TSAC 24 is provided using the Microsoft ActiveX RPD client. This client is provided as a "cab" file and is available from Microsoft Corporation. The client is embedded within the HTML page 22 using javascript code as follows:

<OBJECT language-"javascript" ID="MsRdpClient" CLASSID="CLSID:9059f30f-4eb1-4bd2-9fdc-36f43a218f4a" CODEBASE="msrdp.cab#version=5,1,2600,2180" WIDTH-800 HEIGHT-"200">
</OBJECT>

The client provides a rich scripting interface which allows various properties to be defined before communication is established between the TSAC 24 and the agent 19. In particular, it should be noted that the client provides means to define a virtual communications link which is configured to provide a communications channel having desired properties. In order to use this communications framework, the agent 23 uses a Wtsapi32 API which provides appropriate API calls to allow communication.

Having outlined operation of the invention with reference to FIG. 4, operation of an embodiment of the invention is now described in further detail, focussing upon operation of components provided within the desktop session 13. The described embodiment is based upon the Microsoft Windows@operating system, although it will be appreciated that other operating systems can similarly be used.

Figure 5:
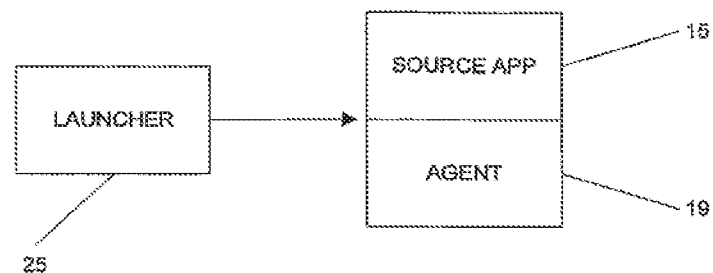
FIG. 5 is a schematic illustration showing operation of a launcher application in an embodiment of the present invention.

As schematically illustrated in FIG. 5, a launcher application 25 runs on the server 1 and launches both the source application instance 15 and its associated agent 19, both running within the desktop session 13 on the server 1. The launcher is an application which is stored on a non-volatile storage device associated with the server 1 and can be run either from the server 1 or from a computer connected to the server 1 via the Internet 2 (FIG. 1).

Although the launcher application 25 can take a variety of forms, in one embodiment of the present invention, the launcher application 25 is launched from a command line and takes as a parameter a file system path for the source application. The launcher application 25 takes as a further parameter a delay time. The delay time indicating a time for which the launcher application 25 should wait after triggering launch of the source application 15 before attempting to create the agent 19, as is described below.

For example, the launcher application may be named tcAppLauncher and be called from the command line as follows:

tcAppLauncher-app"D:\AR System2\ruser.exe"-delay1000 (1)

In this case, the launcher application 25 will launch a source application "aruser.exe", and wait for 1000 milliseconds before initiating the agent 19.

The launcher application 25 can also be called using a command of the following form:

tcAppLauncher-app"D:\ruser.exe"-rt"C:\crt.dll"-delay1000     (2)

In this case, in addition to specifying the source application "aruser.exe", and the delay, a "-rt" parameter is used to specify that the agent 19 to be used is defined by the "tcrt.dll" dynamic link library (dll). It should be noted that when the "-rt" parameter is not used, the launcher application 25 automatically selects a dll which provides the agent 19—that is a dll of predetermined name stored at a predetermined file system path.

The launcher application 25 can also be used to apply the agent 19 to a source application which is already running. In such a case the launcher application takes as a parameter a process id (pid) for the source application which is to be modified. That is, the launcher application is launched as follows:

tcAppLauncher-pid1580     (3)

From the preceding description of the launcher application 25 and the way in which it is run, it can be seen that in general terms, in Backus Naur Form (BNF), the launcher application is called as follows:

```
tcAppLauncher -app < app full path> | -pid <pid> [rt <run-time
DLL full path>]
    [-delay <miliseconds>]
```

Operation of the launcher application 25 is first described in general terms, with a more detailed description being provided below. In cases (1) and (2) above, the launcher application 25 uses a "CreateProcess" windows API call (provided by the kernel32 dll). This call is used to run the source application 15. After waiting for a specified delay time (specified on the command line as described above for example) for all components of the source application 15 to be properly loaded into memory, the launcher application 25 "injects" a DLL providing the agent 19 into the created process. The injected DLL is responsible for performing modifications to the source application 15 at runtime. It will be appreciated that in case (3) above there is no need to call CreateProcess or wait for a predetermined delay time, given that the source application process already exists.

The injection of a DLL providing the agent 19 into the created process associated with the source application 15 is now described.

Figure 6:
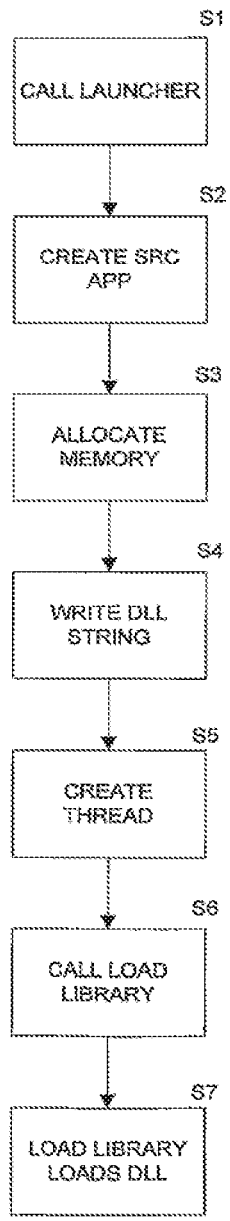
FIG. 6 is a flowchart showing processing carried out by the launcher application of FIG. 5.

FIG. 6 illustrates processing carried out by the launcher application 25 where the launcher application is used to launch the source application (i.e. used in accordance with (1) and (2) above). At step S1, the launcher application is initiated, as described above, and at step 32, the source application instance 15 is created, again as described above. Having created the source application instance 15, the launcher application 25 carries out processing to cause the agent 19 to run within the operating system process of the source application 15. This involves creating an additional thread within the operating system process associated within the source application instance 15. This process is now described with reference to FIG. 6 and FIGS. 7A to 7C.

Figure 7A:
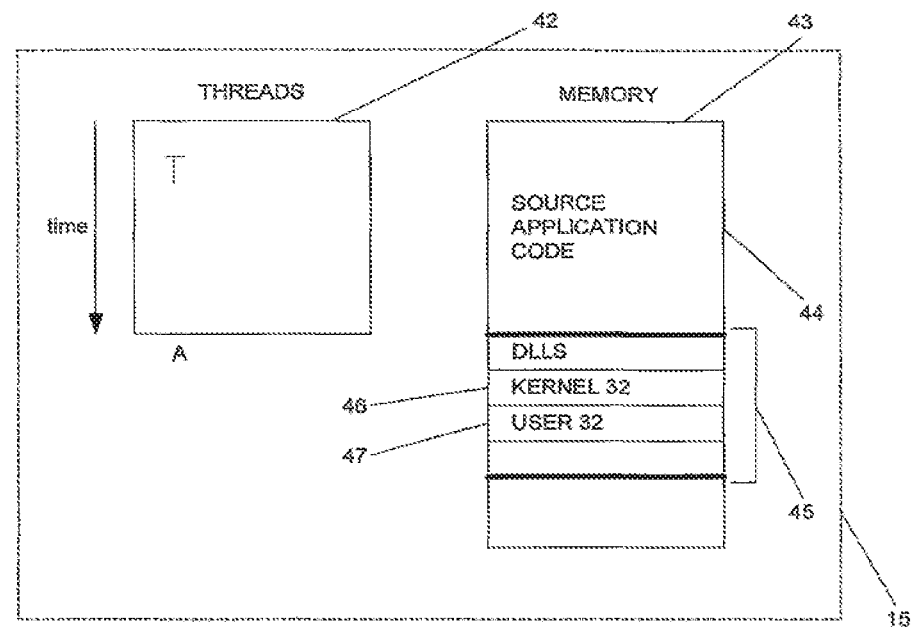
FIGS. 7A to 7C are schematic illustrations of threads and a memory space of an application process showing the effects of processing illustrated in FIG. 6.
Figures 8, 9:
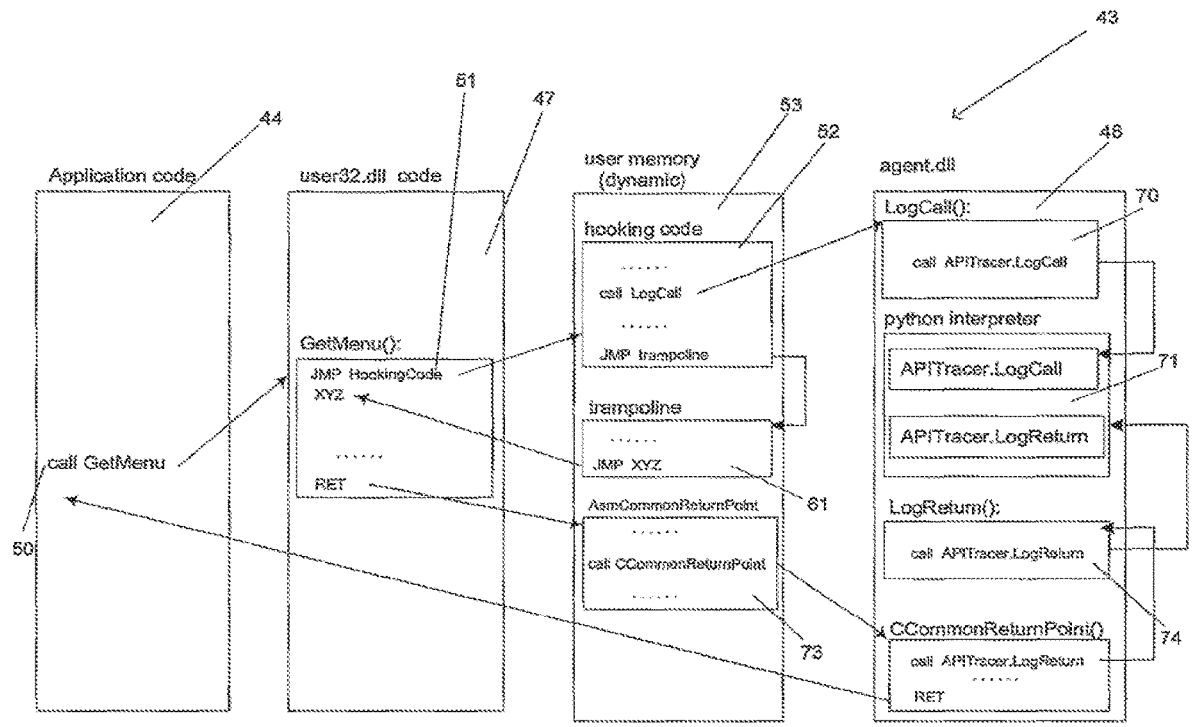

FIG. 7A shows a memory space and threads associated with the source application instance 15, after completion of step S2 of FIG. 8. It can be seen that the source application 15, comprises threads schematically denoted 42 and a memory space schematically denoted 43. It can be seen that the source application instance 15 comprises a single thread A which handles processing associated with the source application 15. The memory space 43 stores program code required for execution of the source application. This memory comprises a first portion 44 storing code associated with the source application 15. The memory comprises a second portion 45 storing libraries used by the program code stored in the first portion of memory 44. In the described embodiment, these libraries take the form of dynamic link libraries (DLLs). It can be seen that two of these DLLs are shown in FIG. 7A, namely a kernel32.dll library 46 providing access to operating system functions, and a user32.dll library providing access to user interface functions.

It should be noted that the launcher application 25 will have a process identifier (pid) for the source application 15, obtained from the call to CreateProcess which generated the source application process. Using this pid, the launcher application 25 can use various functions to perform processing within the memory space of the source application 15. Specifically, referring back to FIG. 6, at step S3, the launcher application 25 uses calls a VirtualAllocEx function provided by the Windows API to obtain a memory allocation. Having obtained a memory allocation at step S3, a string containing the path of the DLL which provides the agent 19 is written to the obtained memory at step S4 using a call to the WriteProcess memory function, again provided by the Windows API.

Having obtained and written to memory associated with the source application 15, at step S5 an additional thread is created in the source application process by the launcher application using the CreateRemoteThread function. At step S6 of FIG. 6, the launcher application 25 calls a LoadLibrary function provided by the kernel32.dll library within the source application 15. The LoadLibrary function operates within the thread created at step S5. The call to LoadLibrary is possible because standard libraries such as kernel32.dll are loaded at standard offsets from an application start address, and LoadLibrary is itself located at a standard offset within the kernel32.dll library. Thus, given knowledge of these two offsets, and knowledge of the start address of the source application instance 15, the launcher application 25 can make a call to the LoadLibrary function.

Figure 7B:
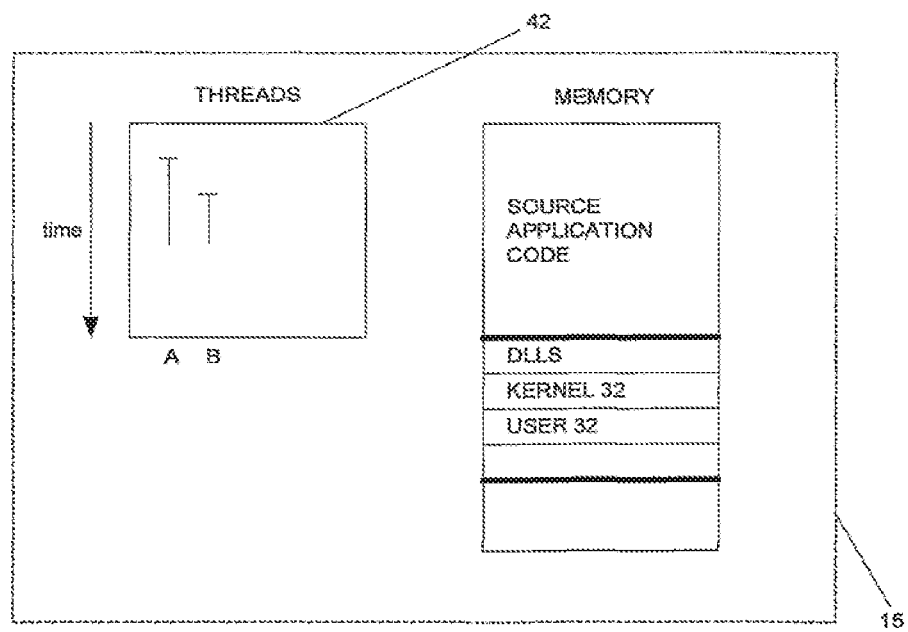
Figure 7C:
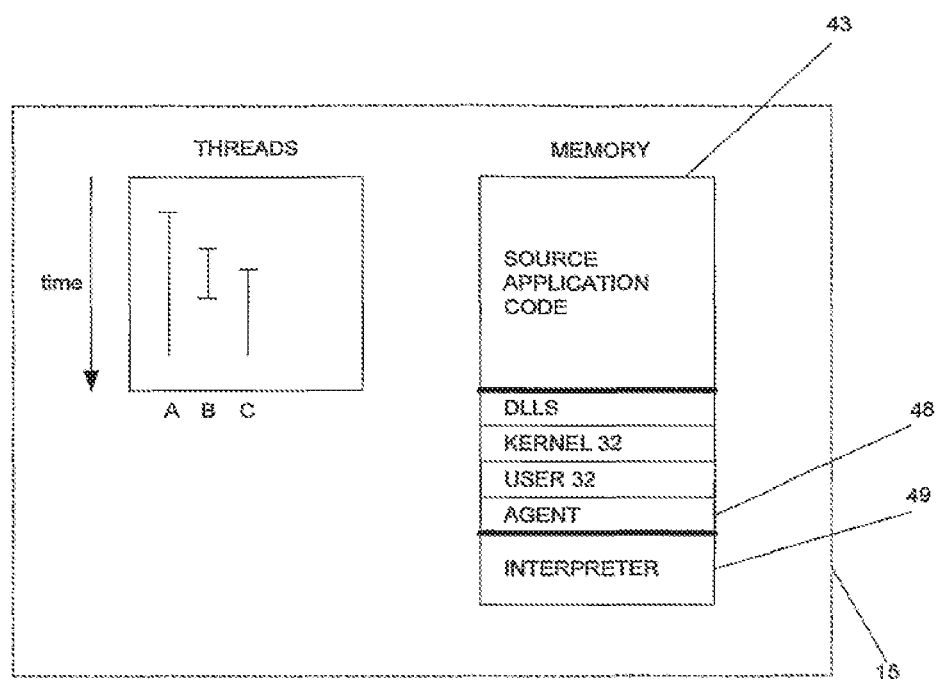

FIG. 7B shows the source application 15 after the LoadLibrary function has been called. It can be seen that the threads schematically denoted 42 now comprise a second thread B, within which the LoadLibrary function call runs. This is the new thread created at step S5 of FIG. 6.

The LoadLibrary function call running within the second thread B loads a library, which provides the agent 19 which runs alongside the source application instance 15. More specifically, this LoadLibrary function call loads an agent library which provides various functions used in application modification operations, as described below. The loading of the agent library by the LoadLibrary function is carried out at step S7 of FIG. 6. The agent library is launched within a separate thread within the source application 15, as shown in FIG. 9C. Here it can be seen that the second thread B has terminated having launched a third thread C. The third thread C runs functions of the agent library, which allow operation of the source application 15 to be affected In FIG. 7C it can be seen that the second portion of memory 45 now includes code of the agent library 48. It can also be seen that the memory 43 allocated to the source application 15 further includes code 49 providing the interpreter described above. In preferred embodiments of the present invention, the interpreter is configured to interpret commands specified in the Python scripting language.

Operation of the agent 19 at a low level is now described in general terms. The description is presented with reference to FIG. 8, and with reference to an example in which an application's behaviour in response to a call to a GetMenu function provided by the user32 dll is modified. As will be described below, behaviour in response to calls to other functions can similarly be modified.

FIG. 8 schematically illustrates the way in which the behaviour of the GetMenu function is changed. It can be seen that the application code 44 of the source application 15 includes a call 50 to the GetMenu function. The GetMenu function is provided by the user32 DLL 47, and control therefore passes from the application code 44 to the code provided by the user32 DLL 47. It can be seen that the user32 DLL 46 provides a block of code 51 defining the GetMenu function, and it is this code which is executed in response to the function call 50. However, given that the GetMenu function is to be modified, so as to provide notification of its call to a component configured to modify its behaviour, the first instruction of the GetMenu function 51 has been modified to be an unconditional jump having as its target predefined hooking code 52 stored within a dynamically allocated part 53 of the memory 43 associated with the source application 15. As will be described in further detail below, the hooking code 52 interacts with the code 51 of the GetMenu function 51 so as to properly affect behaviour of the GetMenu function 51. It can be seen in FIG. 8 that the hooking code 52 makes appropriate calls to the agent DLL 48 to provide modified behaviour, as is described in further detail below.

Operations carried out to set up the code shown in FIG. 8 are now described.

FIG. 9 shows the first eleven instructions of the GetMenu function before any modification has taken place. That is, it shows the GetMenu function before it has been modified so as to include a jump instruction having as its target the hooking code 52. Each line of code shown in FIG. 9 comprises an address 54 at which an instruction is stored, and a hexadecimal representation 55 of the instruction stored at that address. Each line further comprises an opcode 56 and one or more parameters 57 (if appropriate) represented by the hexadecimal representation. It should be noted that code extracts as shown in FIGS. 10, 11, and 12 all include similar components.

In order to establish code as illustrated in FIG. 8, the first five bytes of the GetMenu function 51 are modified so as to provide a jump instruction. Before making such a modification, the first five bytes of the GetMenu function must be saved, so as to preserve operation of the GetMenu function. Referring again to FIG. 9, it can be seen that a first mov instruction 58 comprises two bytes, a push instruction 59 comprises one byte while a second mov instruction 60 comprises two bytes. Thus, it these three instructions 58, 59, 60 which need to be copied before the jump instruction is inserted as the first instruction of the GetMenu function.

The three instructions 58, 59, 60 are therefore copied from the GetMenu function 51 to a trampoline block 61 which is stored within the dynamic memory 53. This trampoline block is shown in FIG. 10, where it can be seen that it comprises the three instructions 58, 59, 60, and an unconditional jump 62 which targets the fourth instruction 63 of the GetMenu Function (FIG. 9). Thus, if the first three instructions 58, 59, 60 of the GetMenu function as shown in FIG. 9 where replaced with a jump instruction targeting the start of the trampoline block 61 (i.e. targeting address 0311PFA8), behaviour of the GetMenu function would remain unchanged.

However, the first three instructions 58, 59, 60 are replaced with a jump instruction targeting the hooking code 52. FIG. 11 shows the GetMenu function after this amendment has been made. It can be seen that the GetMenu function has been modified so as to insert a jump instruction 64 which targets the hooking code 52.

Figure 13:
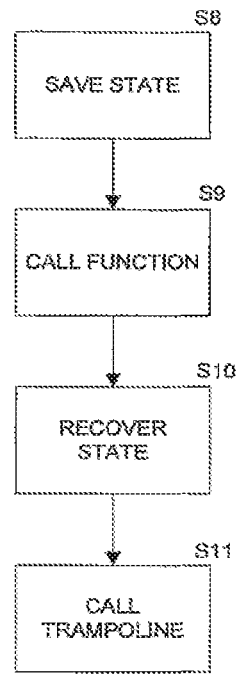
FIG. 13 is a flowchart showing processing carried out by the computer program code of FIG. 12.

FIG. 12 illustrates instructions of the hooking code 52. Operation of the hooking code 52 is illustrated by a flowchart shown in FIG. 13. At step S8 state is saved by pushing all register values onto a stack. At step S9, a LogCall function provided by the agent DLL 48 is called. It is this call which effects modification of behaviour of the GetMenu function, and its functionality is described in further detail below. After the call to the LogCall function, state is recovered from the stack at step S10, and control passes to the trampoline 61 at step S11. Thereafter, the trampoline code executes, returning control to the GetMenu function.

Referring to FIG. 12, it can be seen that the hooking code 52 comprises two push instructions 65 which save register values onto the stack. The hooking code 52 further comprises three instructions 66 configured to load and store onto the stack parameters needed by the LogCall function. The hooking code includes an instruction 67 which calls the LogCall function. Three instructions 68 restore the register state after the call to LogCall (so as to ensure proper operation of the remainder of the GetMenu function). An instruction 69 passes control back to the trampoline block 61.

Thus, it can be seen that by launching the agent DLL 48 in its own thread, modifying instructions of the GetMenu function 51 (having copied instructions to a trampoline block 61), and writing appropriate hooking code 52 to within the memory space of the source application process, the launcher application 25 is able to affect behaviour of the GetMenu function by ensuing that a LogCall function is called each time the GetMenu function is called. This can best be seen in FIG. 8.

The preceding description has been concerned with operation modification of the GetMenu function 51. It will be appreciated that a plurality of functions provided by standard libraries such as user32.dll and kernel32.dll and indeed any other DLL can be suitably modified in this way.

As explained above, the GetMenu function (and any other function modified) is modified so as to call a LogCall function which affects its behaviour. This LogCall function is now described. The LogCall function provided by the agent DLL 48 has a function prototype as follows:
void LogCall (DWORD funcId, PDWORD pFrame)

That is, the function takes as parameters an identifier of the function from which it was called (GetMenu in the example presented above) and a stack frame pointer which provides access to a return address for the function, as well as parameters used in its call. The LogCall function is configured to use the function parameter to call a function configured specifically for the function from which it was called. That is, referring again to FIG. 8, it can be seen that the LogCall function 70 calls an appropriate implementation of the LogCall function provided by a python interpreter 71. That is, a variety of LogCall functions are provided by the Python interpreter 71, each being appropriate for different functions, as described in further detail below.

It should be noted that in addition to calling an appropriate LogCall function provided within the Python interpreter 71, the LogCall function 70 provided by the agent DLL also carries out further modification of the function of interest (GetMenu in the example above). Specifically, the LogCall function called from within the hooking code 52 modifies the return address of the function of interest on the stack, so as to point to a block of code 73 within the dynamically allocated memory 53. The block of code 73 is configured to call a LogReturn function 74 provided by the agent DLL 48, the LogReturn function 74 being configured to further affect the behaviour of the function of interest (i.e. GetMenu in the example presented above). Control returns to the original application code 44 from the LogReturn function.

LogReturn has a similar function prototype to that of LogCall presented above, and again operates by delegating responsibility for modifications to appropriate functions provided by the Python interpreter 71. Such functions are described in further detail below.

It has been indicated above that the LogCall function 70 provided by the agent DLL 48 modifies the return address of the function of interest, so as to ensure that the function of interest calls LogReturn before control returns to the application code 40. It will be appreciated that in order to allow control to return to the correct point within the application code 40, the original return address which is rewritten with that of the block of code 73 must be saved. In order to allow this to occur, a data structure is maintained for each thread. Given that all code within the agent DLL 48 illustrated in FIG. 8 operates within a single thread, all code can access this data structure, which is a declared as being local to a particular thread.

Figure 14:
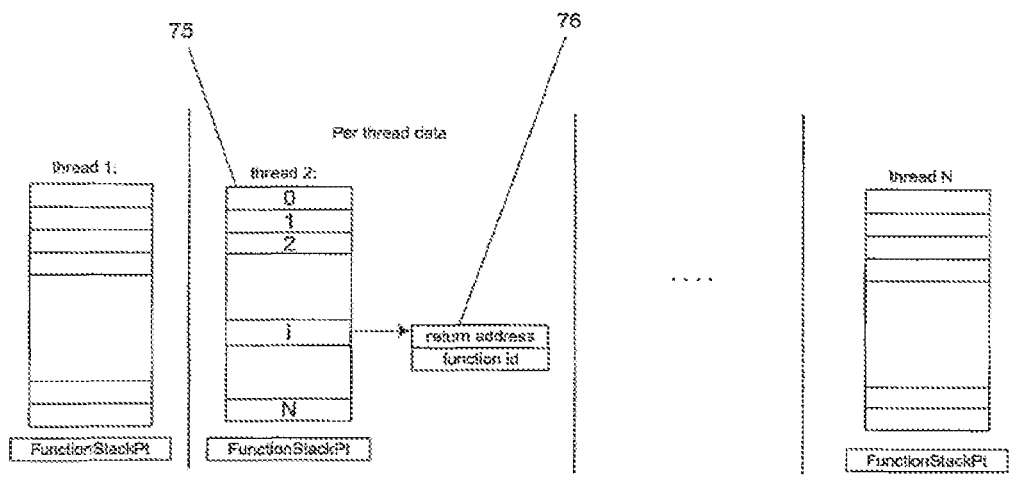
FIG. 14 is a schematic illustration of data structures used by the computer program code shown in FIG. 8.

FIG. 14 shows a plurality of data structures configured to store return address data, each data structure being local to a particular thread. The data structures of FIG. 14 all have the same structure, which is now described with reference to a data structure 75.

The data structure 75 takes the form of a stack storing pointers to data structures 76 storing return address, function ID pairs. When LogCall is called, a pointer (also stored as a thread local variable) is incremented, and a new entry in the data structure 75 is created pointing to the return address and function identifier of the function which called LogCall. When LogReturn wishes to return control to the application code 40, it simply obtains the pointer value, and returns to the appropriate return address. The data structure shown in FIG. 14 is used because it allows nested calls to be handled effectively. Specifically, if LogCall is caused to be called a second time before control has been returned to the application code 40, it will be appreciated that the pointer associated with the data structure 75 is simply incremented, and a new entry created. In such a case, the first return from the LogReturn function will handle this nested call, and decrement the pointer so as to ensure that the subsequent return from LogReturn correctly returns control the application code 40 responsible for the first call to the LogCall function.

It has been described above that implementations of both the LogCall and LogReturn functions are provided by the Python interpreter 71. These calls are now described with reference to FIG. 15. It can be seen that the LogCall function 70 and the LogReturn function 74 both make use of a C-Python interface 80 allowing communication with the code running within the python interpreter 71. Before a Python function is called by either LogCall or LogReturn thread management is ensured by acquiring Python GIL (Global Interpreter Lock), so as to ensure that the called Python function runs without interruption.

Figure 15:
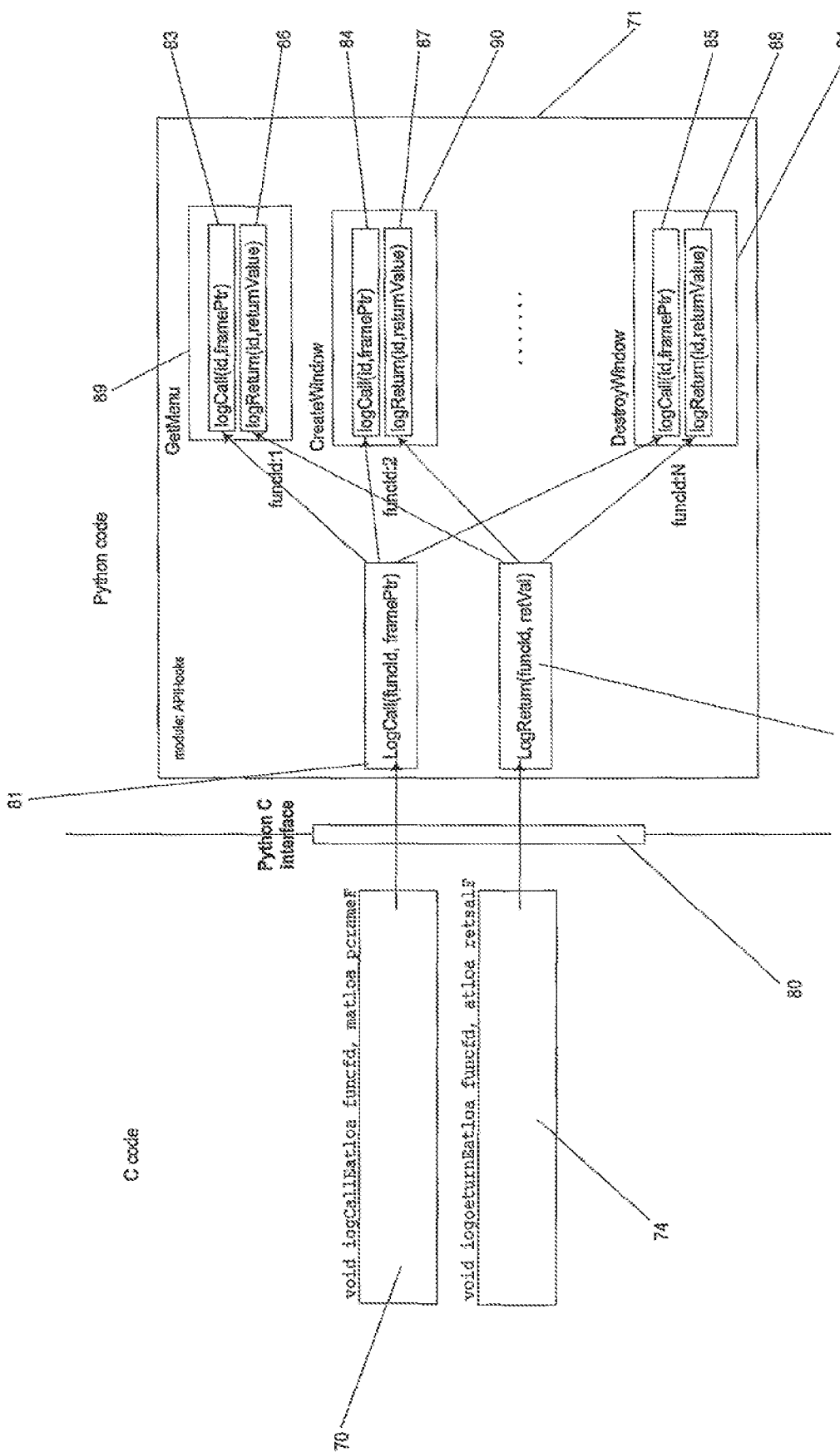
FIG. 15 is a schematic illustration showing interactions between native code and Python code of FIG. 8 in further detail.

The LogCall function 70 calls a LogCall function 81 provided by code running within the Python interpreter 71. This is a generic function which is called in response to all calls to the LogCall function 70. Similarly, a generic LogReturn function 82 provided by the Python interpreter 71 is called in response to call calls to the LogReturn function 74. The generic LogCall and LogReturn functions 81, 82 provided by the Python interpreter process the function identifier passed to them as a parameter, and use this to select a specific LogCall and LogRetun function which provides operational functionality. In FIG. 15, it can be seen that the LogCall function 81 processes the passed function identifier to select between LogCall functions 83, 84, 85, while the LogReturn function 82 uses the function identifier to select one of three LogReturn functions 86, 87, 88. It can be seen that the specific LogCall and LogReturn functions are grouped in pairs, each associated with a particular function causing the call to LogCall or LogReturn. Specifically, it can be seen that the LogCall and LogReturn functions 83, 86 are provided in a class 89 associated with the GetMenu function, the LogCall and LogReturn functions 84, 87 are in a class 90 associated with the CreateWindow function, while the LogCall and LogReturn functions 85, 88 are in a class 91 associated with the DestroyWindow functions. In each case, the specific LogCall and LogReturn functions provided are configured to ensure that appropriate events take place, as described below.

Figure 16:
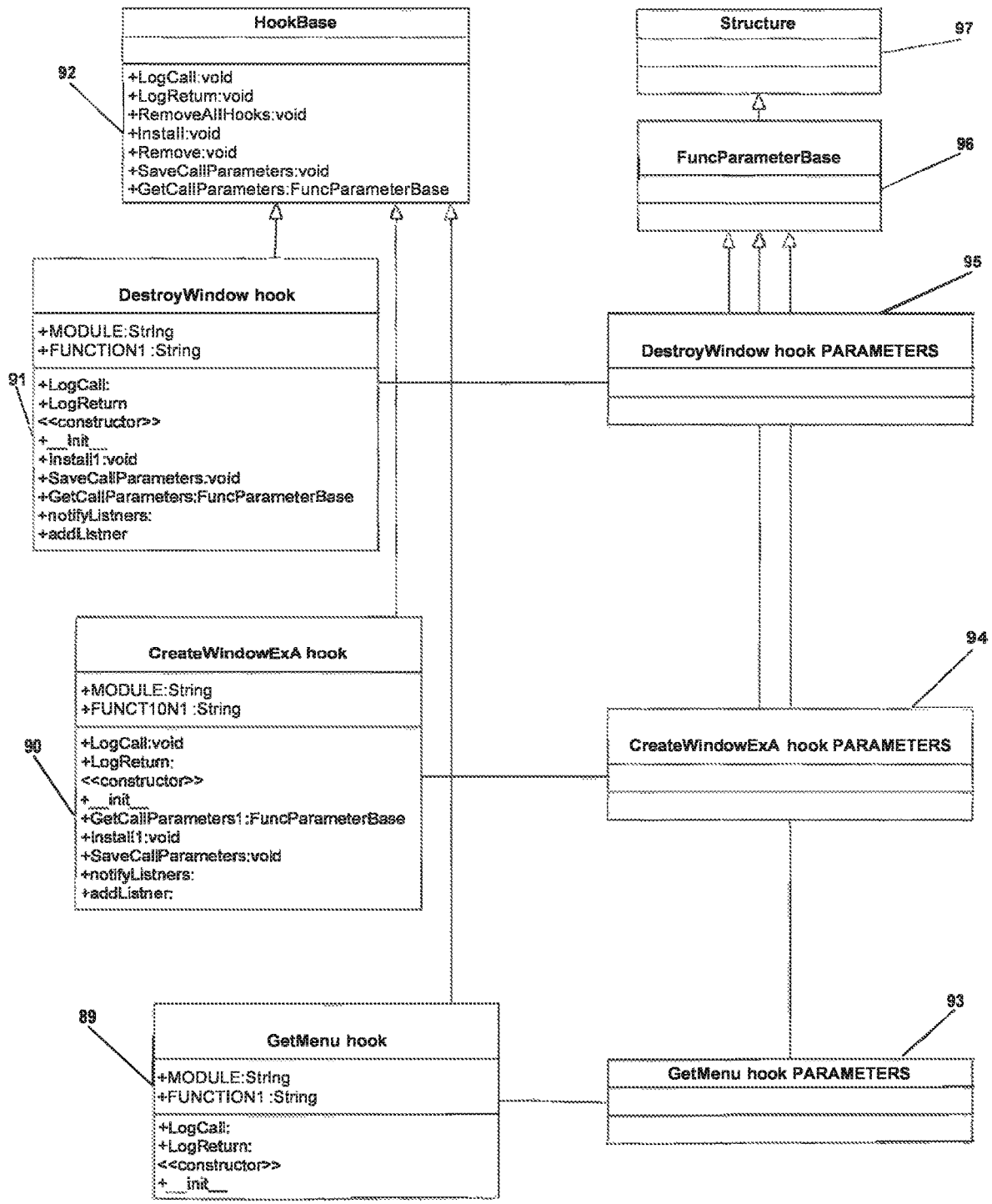
FIG. 16 is a class diagram showing Python classes including the classes shown in FIG. 15.

FIG. 16 shows a hierarchy of Python classes which include the classes 89, 90, 91 mentioned with reference to FIG. 15. It can be seen that the classes 89, 90, 91 which implement specific instances of the LogCall and LogReturn functions are all subclasses of an abstract HookBase class 92. Any calling function with which it is desired to associate a call to LogCall and LogReturn is simply provided with a corresponding class in the hierarchy of FIG. 16. It should be noted that the HookBase abstract class 92 provides various general functionality which is inherited by all classes. For example, the HookBase class 92 includes SaveCallParameters and GetCallParameters methods which are used by all subclasses in manipulating function call parameters.

It can be seen from FIG. 16 that each of the classes 89, 90, 91 has an associated parameters class 93, 94, 95 parameters class. These classes are populated by methods provided or inherited by the classes 89, 90, 91 to properly store parameters associated with functions calling LogCall and LogReturn. It can be seen that the parameter classes 93, 94, 95 are all subclasses of a FunctionParameterBase class 96. The FunctionParameterBase class 96 is itself a subclass of a Structure class 97, the class 97 providing a structure which is configured by its subclasses to be suitable for storage of appropriate parameters.

It should be noted that the agent DLL 48 runs within a single thread, and typically does not spawn further threads during its operation. It is however important to ensure that all code concerned with interface modification operates as quickly as possible, so as to return control to the application code 40. It also be noted that the Python interpreter 71 runs only one single native thread for all Python threads, and ensures synchronisation using the Python GIL.

It should further be noted that while there is one instance of the code blocks shown in the dynamic memory 53 for each function which is to be modified, while there is a single instance of the DLL 48 for each source application.

The preceding description has been concerned with methods for causing particular functions (LogCall and LogReturn) to be called when a predetermined function is called by the application code 40. It has been explained that these generic functions call generic functions provided within the Python interpreter 71, which in turn call specific functions provided by the Python interpreter 71. It has been explained that these specific functions are provided by classes as illustrated in FIG. 16.

The following description is concerned with associating the techniques described above with particular GUI elements to cause modification, and also with appropriate configuration methods.

Figure 17:
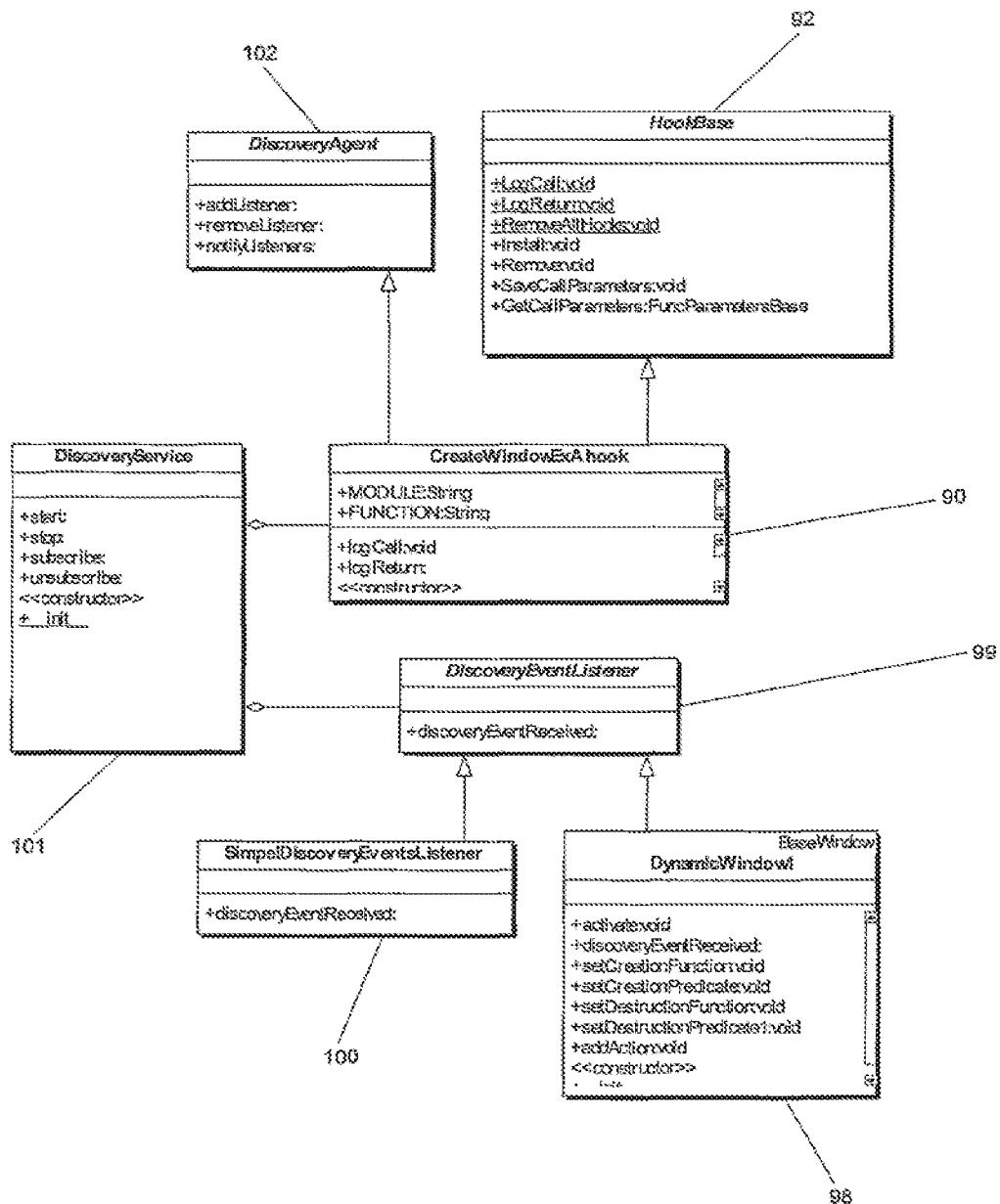
FIG. 17 is a class diagram showing classes used for communication using the classes of FIG. 16.
Figure 18:
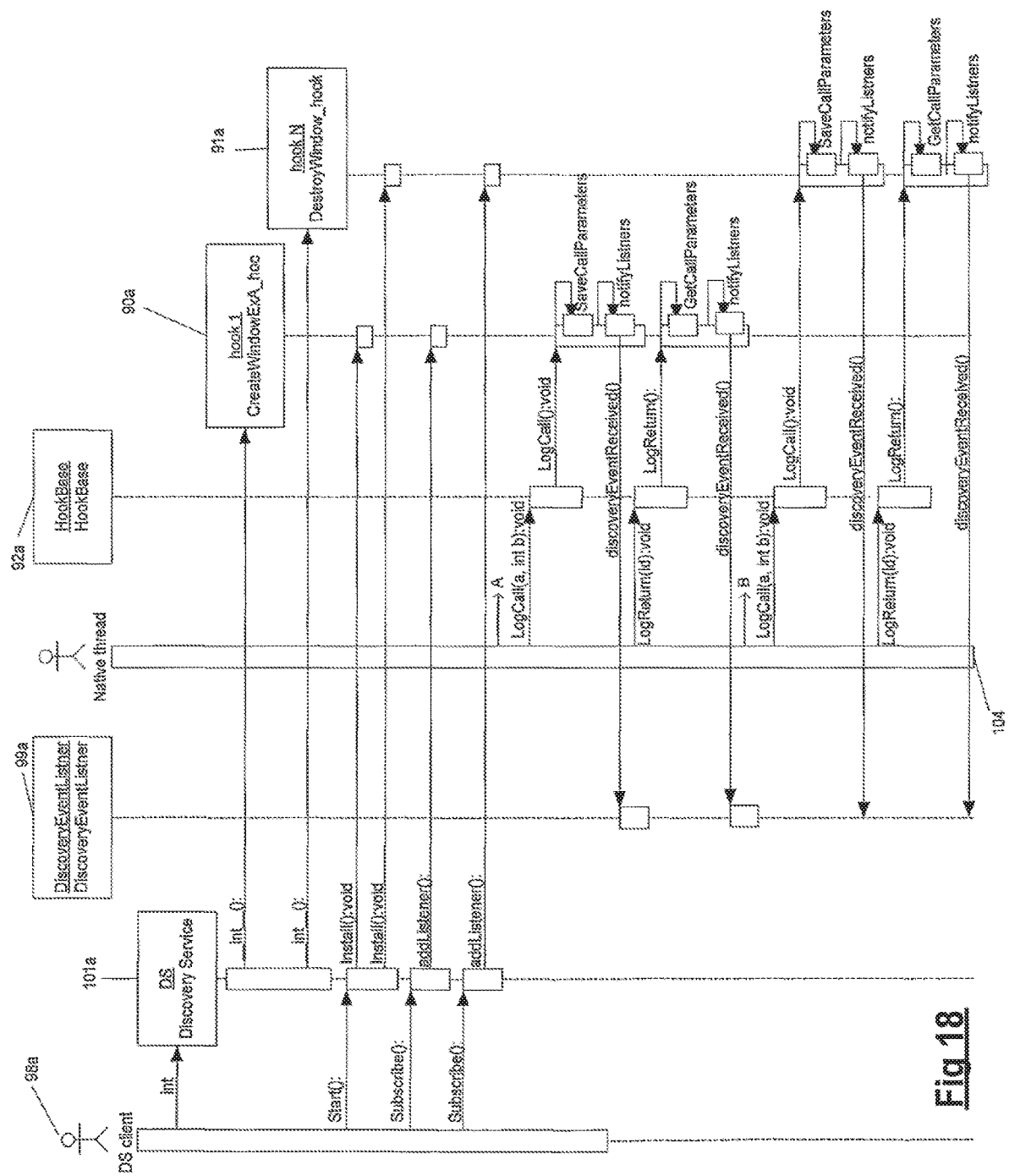
FIG. 18 is a sequence diagram illustrating usage of the classes of FIGS. 16 and 17.

FIGS. 17 and 18 show classes used to associate calls to LogCall and LogReturn with particular GUI elements. In particular, in the described example it is desired to ensure that LogCall and LogReturn are called when a CreateWindow function associated with a particular dynamic window within a GUI is called. In FIG. 17, it can be seen that the class 90 providing specific versions of the LogCall and LogReturn functions for the CreateWindow function is shown, along with its inheritance from the HookBase class 92. It can further be seen that a class 98 is used to model a dynamic window of interest. It can be seen that the class 98 is a subclass of a DiscoveryEventListener class 99 which ensures that the class 98 can be monitored as desired. The class 99 has as a subclass of SimpleDiscoveryEventListeaer class 100.

SimpleDiscoveryEventListener is a simple implementation of DiscoveryEventListener. Simple Discovery Event Listener illustrates that there might be other clients of Discovery Service than the DynamicWindow class. For example, there might be cases where configuration code may want to listen to API calls for reasons other than those related to events associated with a user interface.

The DiscoveryEventListener class 99 is used by a DiscoverySeverice class 101. The DiscoveryService class provides a service to its clients, whereby the clients can register to be notified of calls to a particular function associated with a particular GUI element. It will be appreciated that in providing this service the DiscoveryService class 101 makes use of objects which are instances of classes such as the class 98 representing GUI objects, and objects which are instances of classes such as the class 90 representing function calls of interest.

It should be noted that the class 90 is additionally a subclass of a DiscoveryAgent class 102 so as to ensure that it provides the necessary functionality.

Use of the classes illustrated in FIG. 17 to ensure that a particular client is informed of particular manipulations of a particular GUI element is now described with reference to FIG. 18. Here it can be seen that a client 98a (which is an object which is an instance of the class 98) calls an init method associated with a DiscoveryService object 101a which is an instance of the DiscoveryService class 101. In response to the this init call, the DiscoveryService object 101a calls init methods provided by objects associated with two functions of interest associated with the GUI element represented by object 98a. It can be seen these functions are the CreateWindow and DestroyWindow functions, which are respectively represented by objects 90a and 91a which are instances of the classes 90, 91 shown in FIG. 16 respectively.

When the client 98a wishes to start causing LogCall and LogReturn to be called in response to calls to the CreateWindow and DestroyWindow functions, a start method provided by the DiscoveryService object 101a is called, causing install methods to be called on each of the objects 90a, 91a. These calls to the install methods cause code associated with the CreateWindow and DestroyWindow functions to be modified so as to call LogCall and LogReturn, in the manner described above with reference to FIG. 8 and subsequent Figures.

Having made appropriate modifications to the code of the functions to be modified, the client 98a then uses a subscribe method provided by the DiscoveryService object 101a to ensure that calls to LogCall and LogReturn caused by the functions represented by the classes 90a, 91a are notified to the client 98a. At this stage, the client 98a (which it will be recalled is an object representing the GUI element of interest) will receive notifications when CreateWindow or DestroyWindow are called.

FIG. 18 illustrates a native thread 104 which, at some point during its lifetime calls the CreateWindow function (this call is schematically noted A in FIG. 18). Given the operations described above which have been carried out, this causes the LogCall function to be called. Initially, within the Python interpreter, this call is directed to the HookBase class before being redirected to the object 90a. The LogCall function then causes stack parameters to be appropriately handled, before using a DiscoveryBventListener object 99a to inform the client 98a that the CreateWindow function has been called.

Similarly, it can be seen that FIG. 18 shows a call to the DestroyWindow function being made (schematically denoted B). This call causes similar processing to that described above with reference to the CreateWindow function.

The description presented with reference to FIGS. 17 and 18 explains how a client can obtain notification when particular functions are called. It will be appreciated that client objects receiving such notifications will carry out processing to cause a source application to be appropriately modified. Configuration of objects to receive and act upon notifications is now described, initially with reference to the schematic illustration of FIG. 19.

Figure 19:
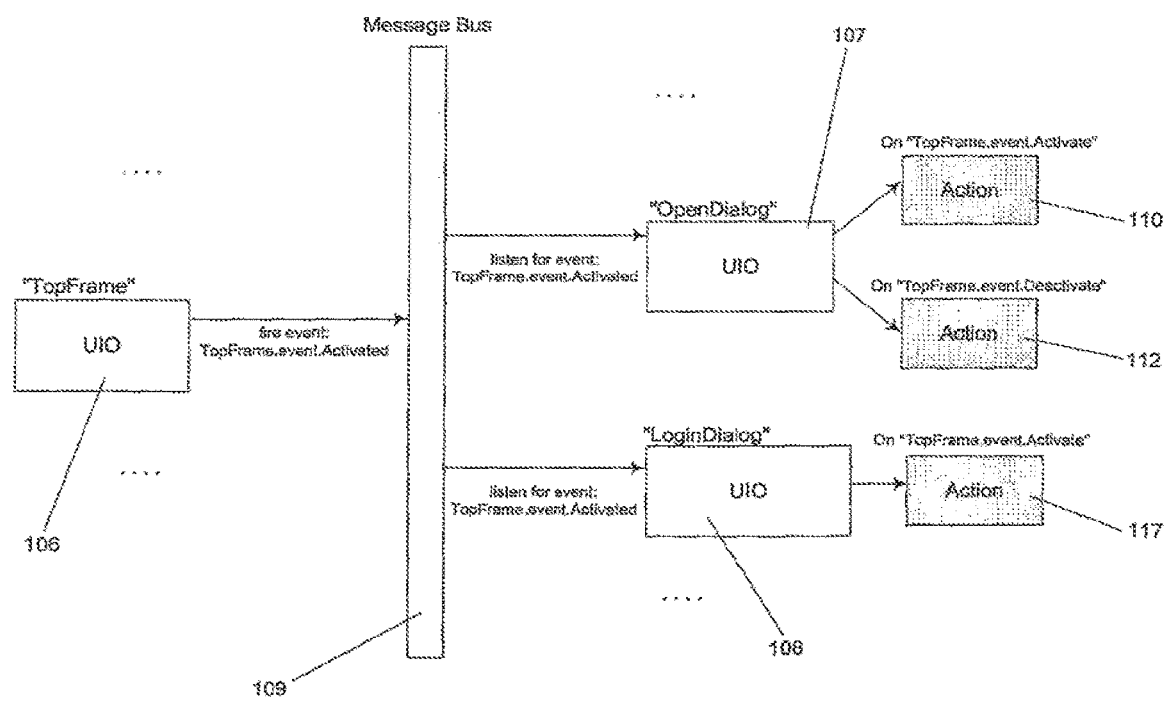
FIG. 19 is a schematic illustration of an object model used to represent part of a graphical user interface.

FIG. 19 illustrates three objects 106, 107, 108, all of which are instances of subclasses of a UIObject class which is used to model objects of interest within a GUI. It can be seen that an object 106 represents a top frame of the GUI, while objects 107, 108 represent open and login dialog boxes respectively. In the illustration of FIG. 19, the object 106 causes an event to be fired indicating that the top frame which it represents has been activated. This event is transmitted on a message bus 109, and passed to the objects 107, 108, both of which are configured to listen for such activation events. On being notified of the activation event, the objects 107, 108 are configured to cause predetermined processing to be carried out. It can be seen that the object 107 causes an action defined by an object 110 to be carried out, while the object 108 causes an action defined by an object 111 to be carried out. It can be seen from FIG. 19 that the object 107 is also configured to carry out an action 112 in response to the top frame object 106 providing a deactivation event.

The action objects 110, 111, 112 shown in FIG. 19 are configured to cause modification of elements of the GUI. It will be appreciated that in order to carry out such modification, the action objects 110, 111, 112 need a handle to the appropriate user interface element. This is ensured by the action of LogCall, and the way in which messages are passed by the discovery service to the object 106 as described above.

Figure 20:
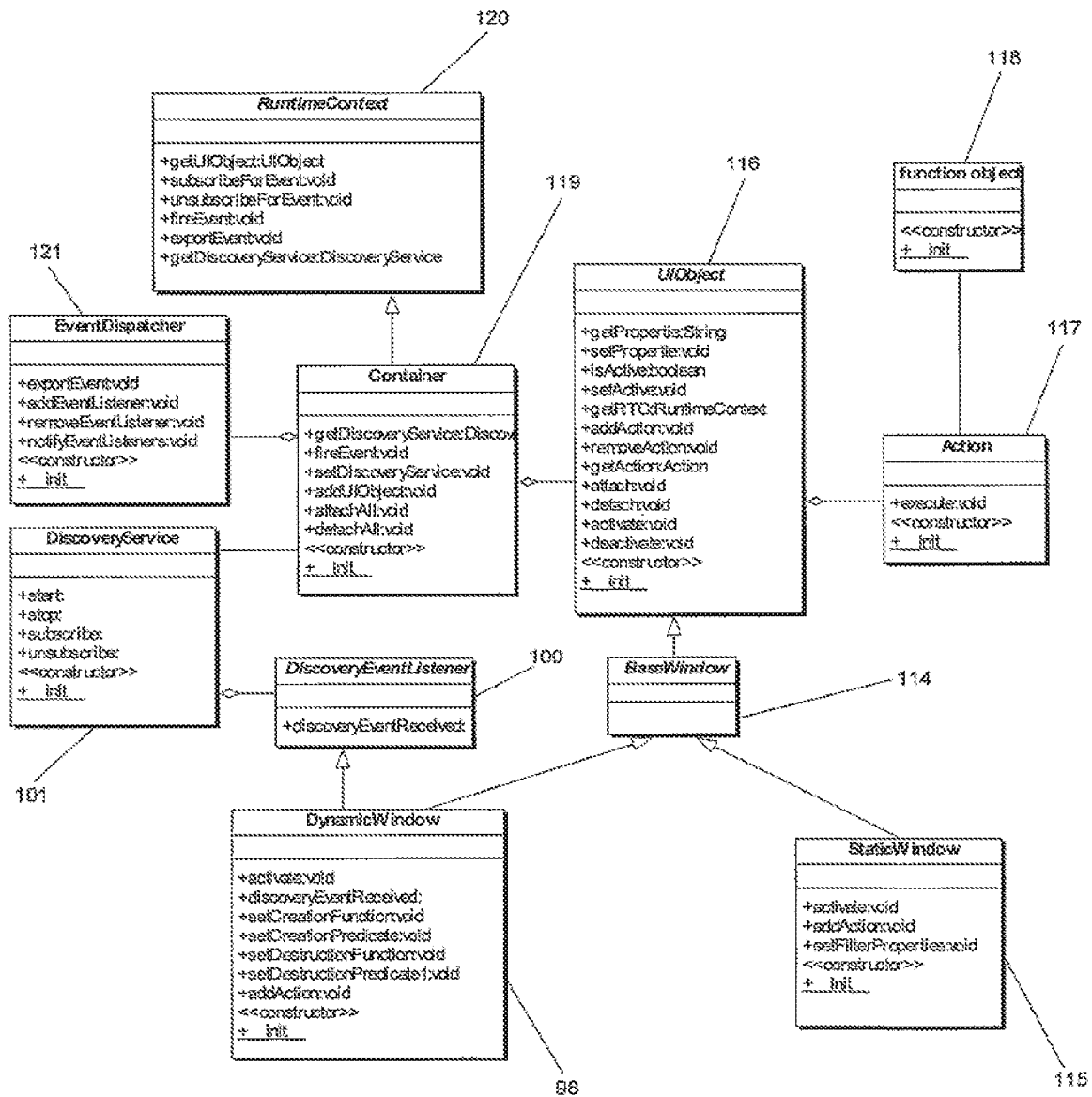
FIG. 20 is a class diagram showing classes used in the model of FIG. 19.

Referring to FIG. 20, classes relevant to the schematic illustration of FIG. 19 are shown. It can be seen that the dynamic window class 98 (shown in FIG. 17) is a subclass of a BaseWindow class 114, as is a StaticWindow class 115. It should be noted that static windows represented by the StaticWindow class 115 exist for the lifetime of an application. Such windows can be identified in terms of their handlers relatively straightforwardly be traversing the window tree of their application.

Dynamic windows represented by the DynamicWindow class 98 are created and destroyed during an application's lifetime. Accordingly, handlers for such windows must be dynamically discovered at runtime using methods such as those described above. For this reason, the DynamicWindow class 98 is a subclass of the DiscoveryEventListener class 100, which is used by the DiscoveryService class 101, as described above. The StaticWindow class 115 does not have such relationships.

It can be seen that the BaseWindow class 114 is a subclass of a UIObject class 116 which is the class used to model all user interface objects in models of the form shown in FIG. 19. It can be seen that the class diagram of FIG. 20 further shows an Action class 117 which is a subclass of a FunctionObject class 118. The Action class 117 is used to model actions such as the Actions 110, 111, 112 shown in FIG. 19.

FIG. 20 further shows a Container class 119 which acts as a controller for all UIObject objects. The Container class is a subclass of the RuntimeContext class 120.

The Container class 119 makes use of an BventDispatcher class 121 which allows UIObjects to dispatch events, as described above with reference to FIG. 19.

The Runtime context class 120 is essentially an interface that the Container class 119 implements and that interface is used by the client UIObject to communicate with the Container class 119 and the services. It is part of the contract between the UIObject class 116 and the Containerclass 119.

Figure 21:
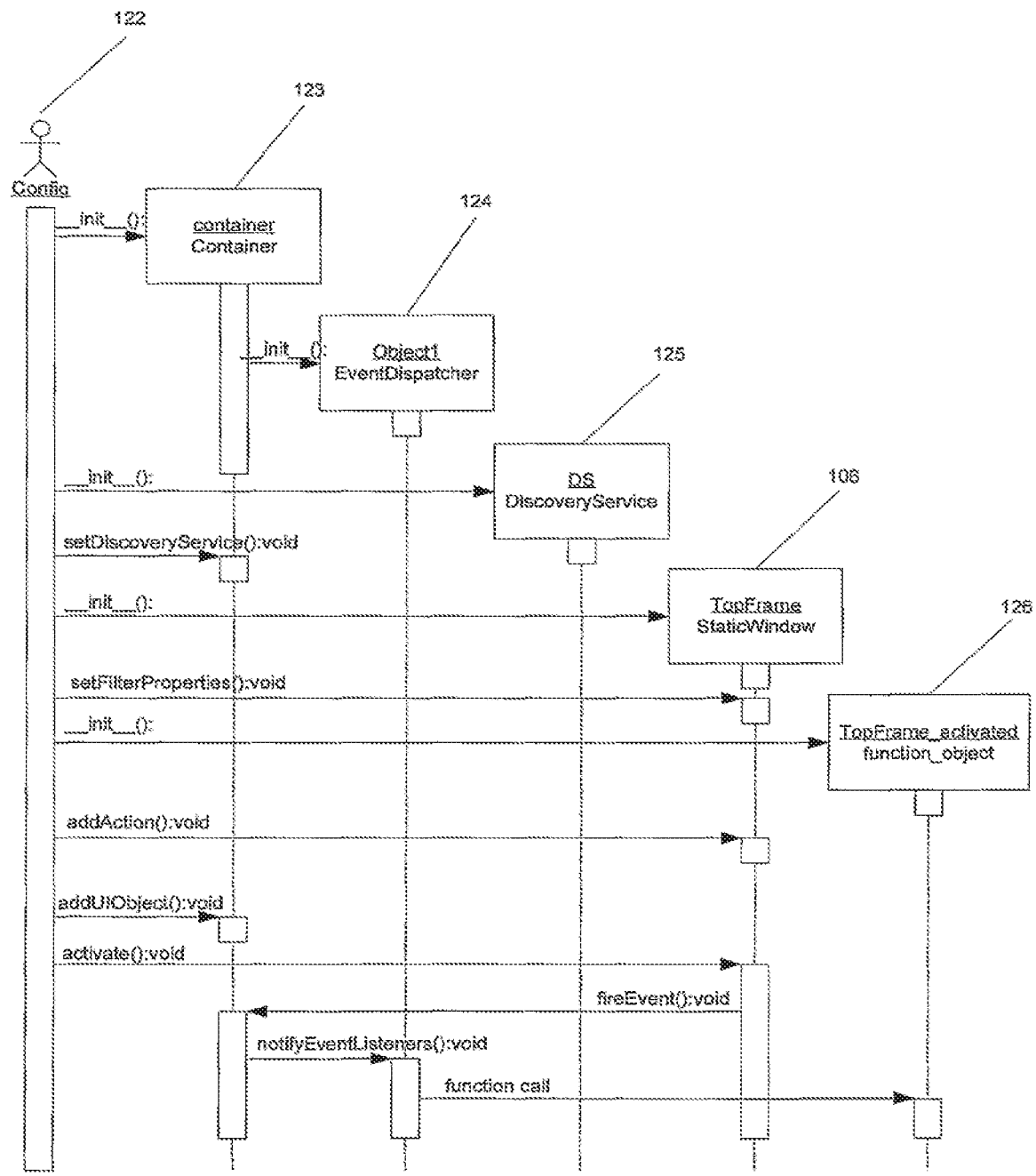
FIGS. 21 and 22 are sequence diagrams showing usage of the classes of FIG. 19.

FIG. 21 is a sequence diagram showing how classes illustrated in FIG. 20 interact in the example of FIG. 19. A configuration client 122 calls an init method provided by a Container object 123, which results in a call being made to an init method provided by an EventDispatcher object 124. The configuration client 122 also calls an init method provided by a DiscoveryService object 125. The configuration client then calls a setDiscoveryService method provided by the Container object 123 causing the Container object 123 to be associated with the DiscoveryService object 125. These method calls effectively set up classes required to allow general message passing operations to take place.

Having carried out the method calls described above, the configuration client 122 then calls an init method provided by the TopFrame object 106, and then uses a setFilterProperties method. The setFilterProperties method is used to define the way in which the GUI element represented by the TopFrame object 106 will be identified, and suitable identification methods are described in further detail below. Next, the configuration client 122 calls an init method provided by an Action object 126, and having initialised the object 126, the Action object 126 is associated with the TopFrame object 106 using an addAction method provided by the TopFrame object 106. Having correctly established the objects 106, 126, the TopFrame object is added to the Container object 122 using an addUIObject method provided by the Container object 122.

Having correctly established the necessary objects, the TopFrame object 106 is activated so as to be ready to fire events as appropriate. When appropriate, the TopFrame object 106 fires an event, which is processed by the Container object 122. The Container object 122 calls a notifyEventListners (methods, which in this case causes a call to be made to the function represented by the Action object 122.

It can be seen from the preceding description that methods are provided which allow events associated with static windows to be appropriately processed. Processing of events associated with dynamic windows is now described with reference to FIG. 22.

Figure 22:
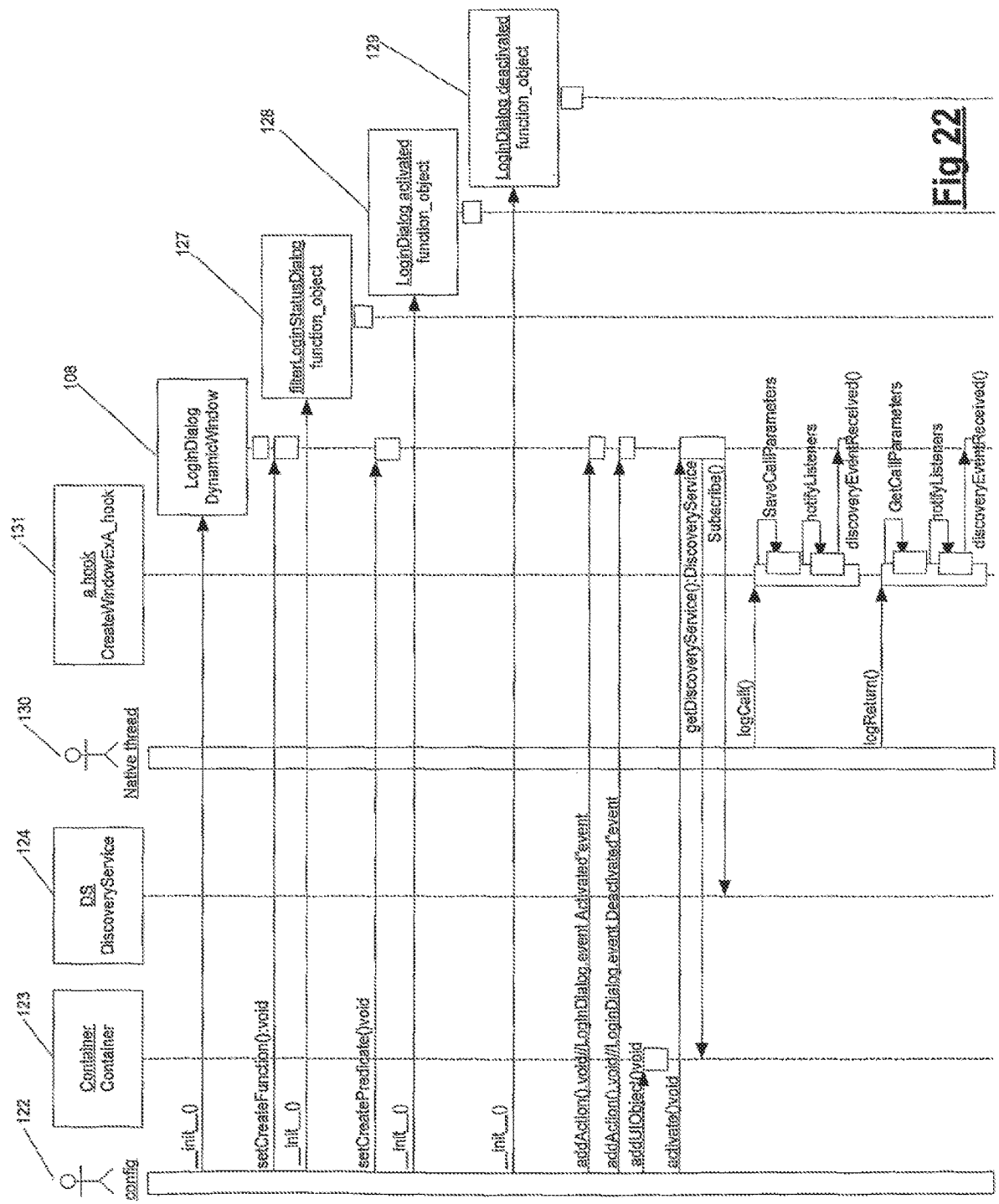

Referring to FIG. 22, it can be seen that the configuration client 122 calls an init method provided by the LoginDialog object 108. It is to be noted that because the LoginDialog object 108 represents a dynamic object, the object 108 may well exist before the corresponding GUI element is created at runtime. The configuration client 122 calls a setCreationFunction method provided by the LoginDialog object 108 to define the way in which the LoginDialog object 108 is created. The SetCreationFunction call specifies an API function to listen to. There are number of functions which can be used to create a window, such as CreateWindowA, CreateWindowW, CreateWindoExA, CreateWindowExW and so on. The Login Dialog has to know exactly which function is going to carry out creation, and this is achieved using the SetCreationFunction call. The configuration client 122 then calls an init method to define the way in which the login dialog is identified, before calling a setCreation predicate method provided by the LoginDialog object 108 is called.

The LoginDialog object 108 is notified for every call to the creational function (set using SetCreationFunction), at that point a filtering function is called which evaluates to True or False on the question "Is this the created window the one I am looking for?". SetCreationPredicate is used to set the filtering function. For example:

```
def filterServiceManagementWindow(rv,params):
    winClass = GetClassName(rv)
    winText = GetWindowText(rv)
    if winClass == "AfxFrameOrView42" and winText=="Login Status" :
        return True
    else:
        return False
```

The object 127 shown in FIG. 22 is used to perform filtering as shown in the example code.

Appropriate action objects 128, 129 to be associated with the LoginDialog object 108 are then created using their init methods. These objects respectively represent actions to be carried out on when the LoginDialog is activated and deactivated. These actions are then associated with the LoginDialog object 109, before the Login Dialog object 108 is added to the Container object 123, before being activated using its activate method.

The LoginDialog object 108 then calls getDiscoveryService and subscribe methods. These ensure that the LoginDialog object is informed of events of interest occurring within other GUI elements.

FIG. 22 then illustrates processing carried out when LogCall is called from a native thread 130. It can be seen that a call to LogCall is made to a hook object 131 which correctly handles stack parameters as described above, before calling notifyListeners to notify all appropriate objects, including in this case the LoginDialog object 108. FIG. 22 also shows processing carried out when LogReturn is called. It can be seen that this processing is very similar to that for LogCall.

Figure 23:
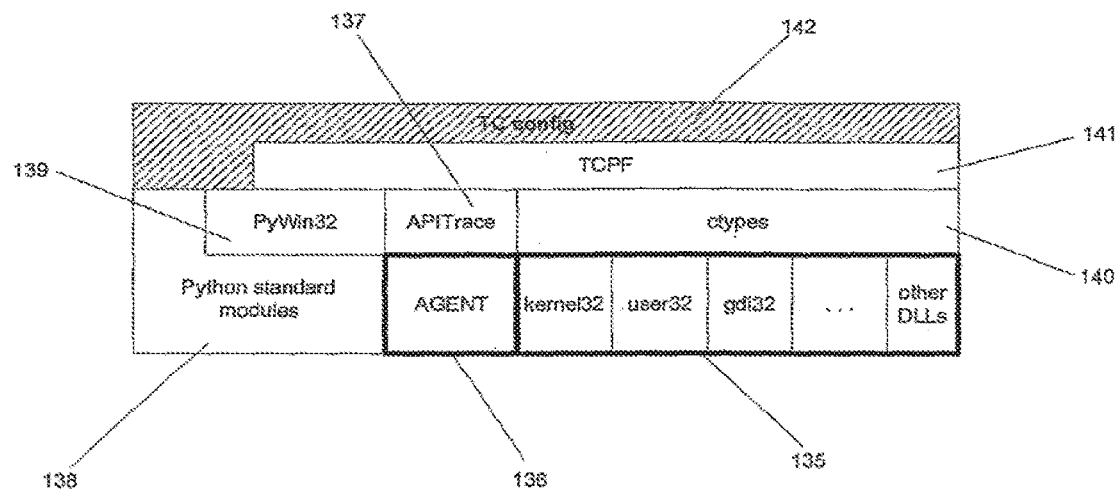
FIG. 23 is a schematic illustration of components used to implement an embodiment of the invention.

FIG. 23 is a schematic illustration of components of the embodiment described above. It can be seen to show standard DLLs 135 which are used by the embodiment, as well as an agent DLL 136 which is configured provide the interface between application code and code within the Python interpreter. It will be recalled (for example from FIG. 15), that generic LogCall and LogReturn functions are provided within the Python interpreter, and these are represented by Python code 137 in FIG. 23. It can be seen that standard Python modules 138 and a Python-operating system interface 139 are also provided, as is a ctypes module 140 which allows C code to call Python functions as described above.

FIG. 23 further shows framework classes defined in Python (and illustrated in FIGS. 16, 17 and 20) which are used by the invention, and a configuration layer 142 which represents a system configuration, for example the configuration described with reference to FIG. 19.

It can be seen from FIG. 23 that the Agent DLL 136 and API trace Python code 137 provide an effective interface between DLLS 135 and bespoke Python code as provided by the classes 141 and the configuration 142.

The preceding description has presented various components which together allow application user interfaces to be modified at runtime. An example of how these components can be used to modify and incorporate user interface components is now presented.

Figure 24A:
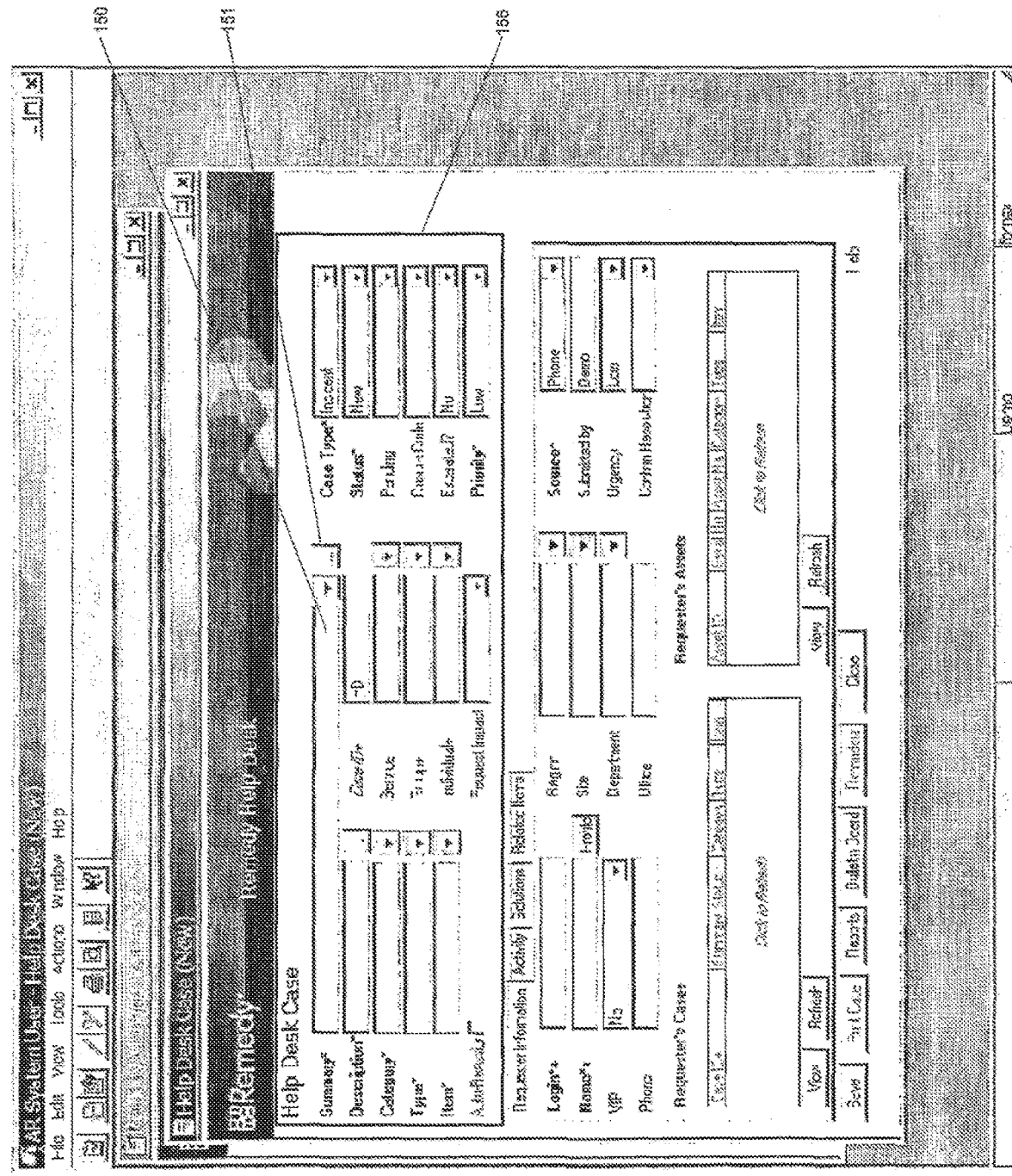
FIGS. 24A and 24B are screenshots from a source application.
Figure 24B:
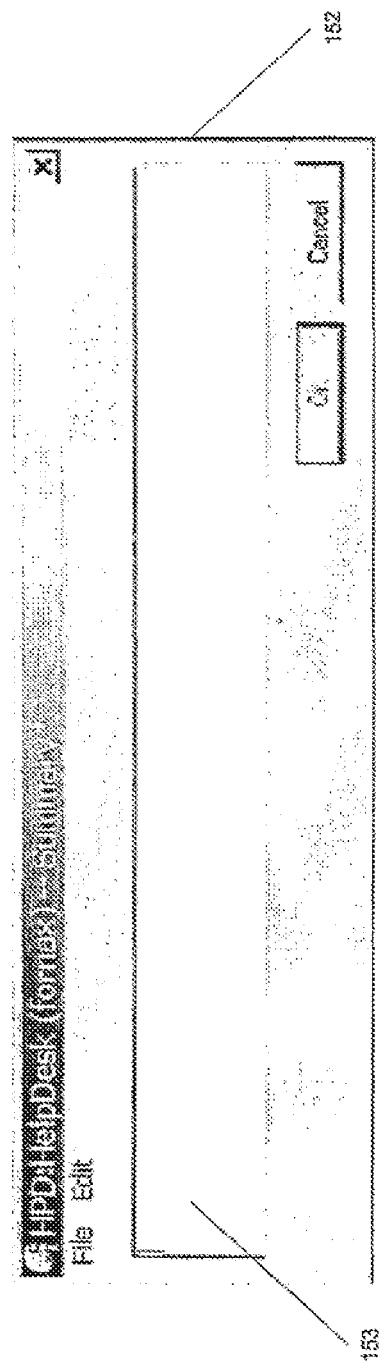

FIGS. 24A and 24B are screenshots from a helpdesk management application (referred to as the source application), where issues are described using the displayed interface. FIG. 24A includes a summary textbox 150. This textbox has an associated button 151 which, when selected, causes a dialog 152 illustrated in FIG. 24B to be displayed. The dialog 152 provides a larger text box 153 in which summary information can be input.

FIGS. 25A to 25E show how the interface of FIGS. 24A and 24B can be modified at runtime, and incorporated into a further user interface (referred to as the target user interface).

Figure 25A:
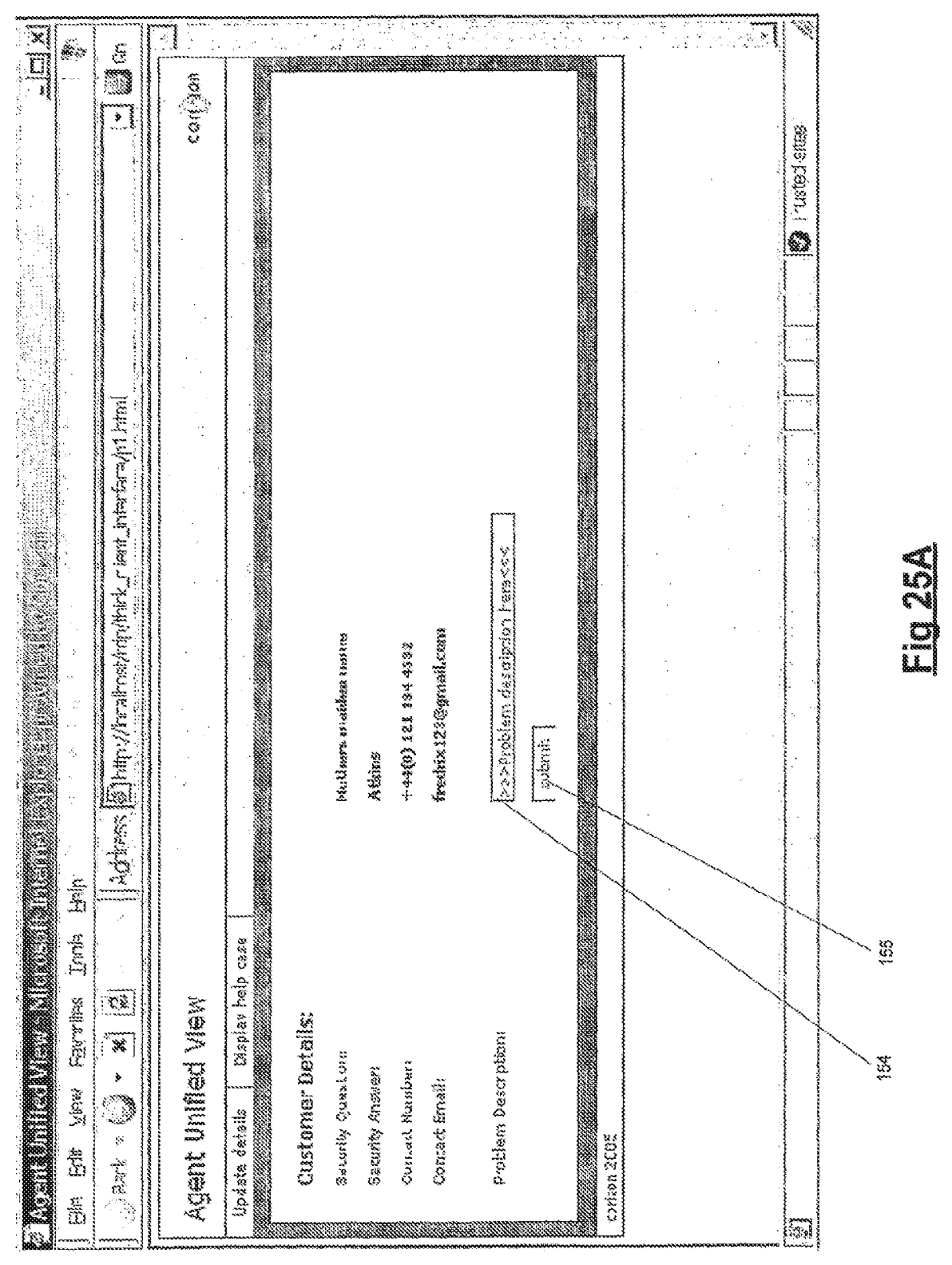

Referring first to FIG. 25A, this shows the target user interface. It can be seen that a text box 154 is used to enter a problem description, and when an appropriate description has been entered, a submit button 155 is used to request an appropriate part of the source application interface together with appropriate data. It should be noted, referring back to FIG. 4, that the interface as displayed in FIG. 25A constitutes the HTML page 21 of FIG. 4, while the source application of FIG. 24 is the source application 15 of FIG. 4.

Figure 25B:
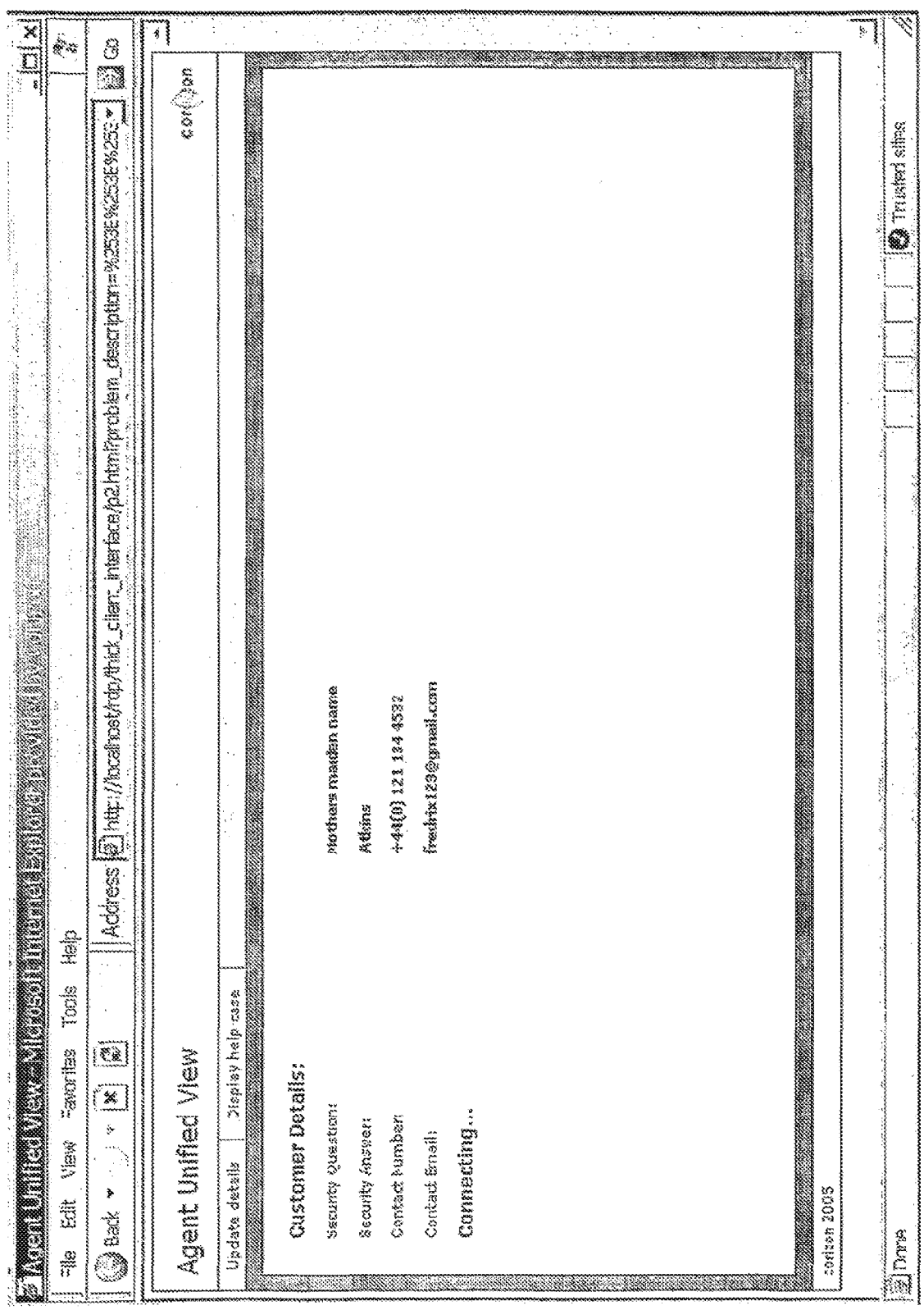
Figure 25C:
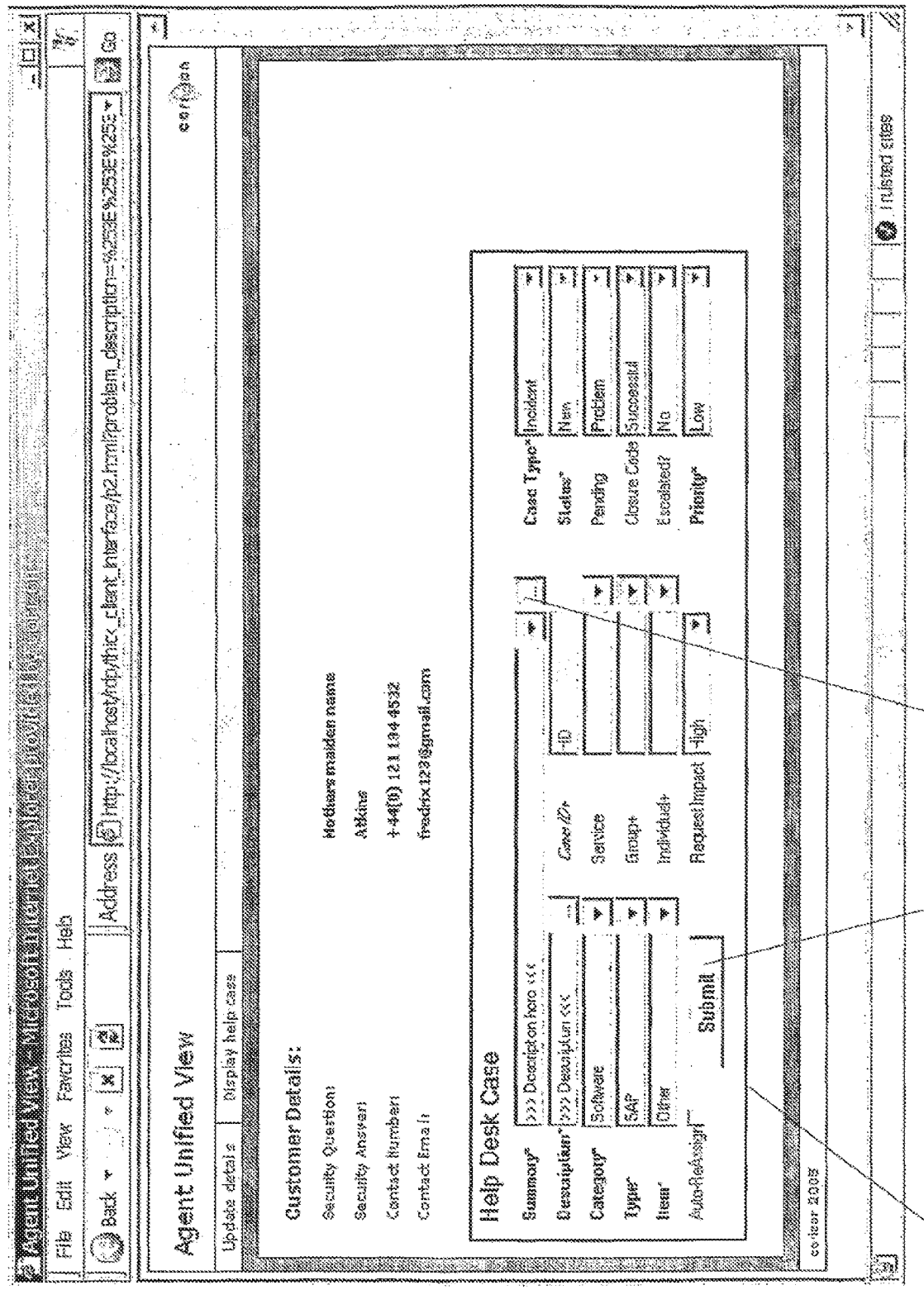
Figure 25D:
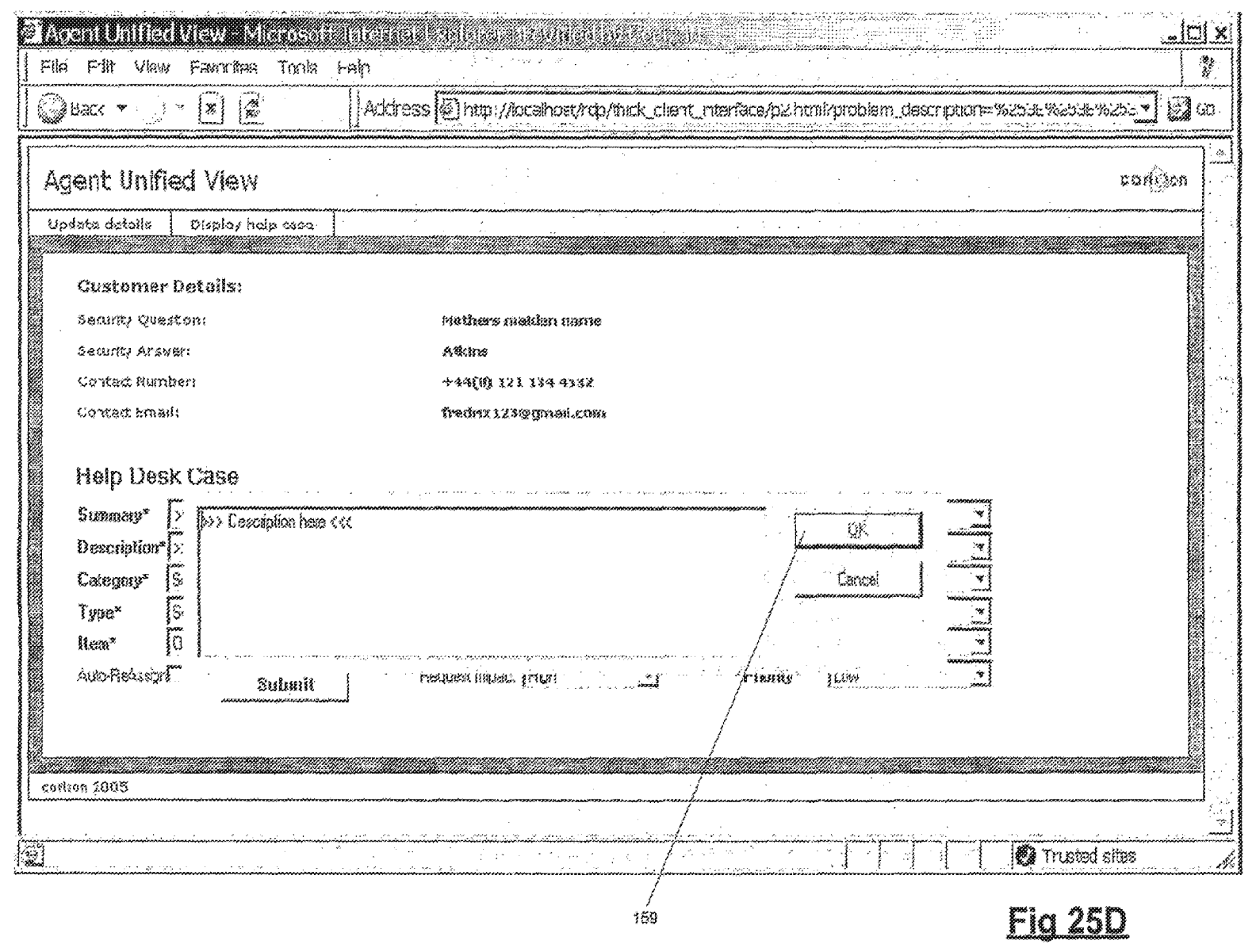
Figure 25E:
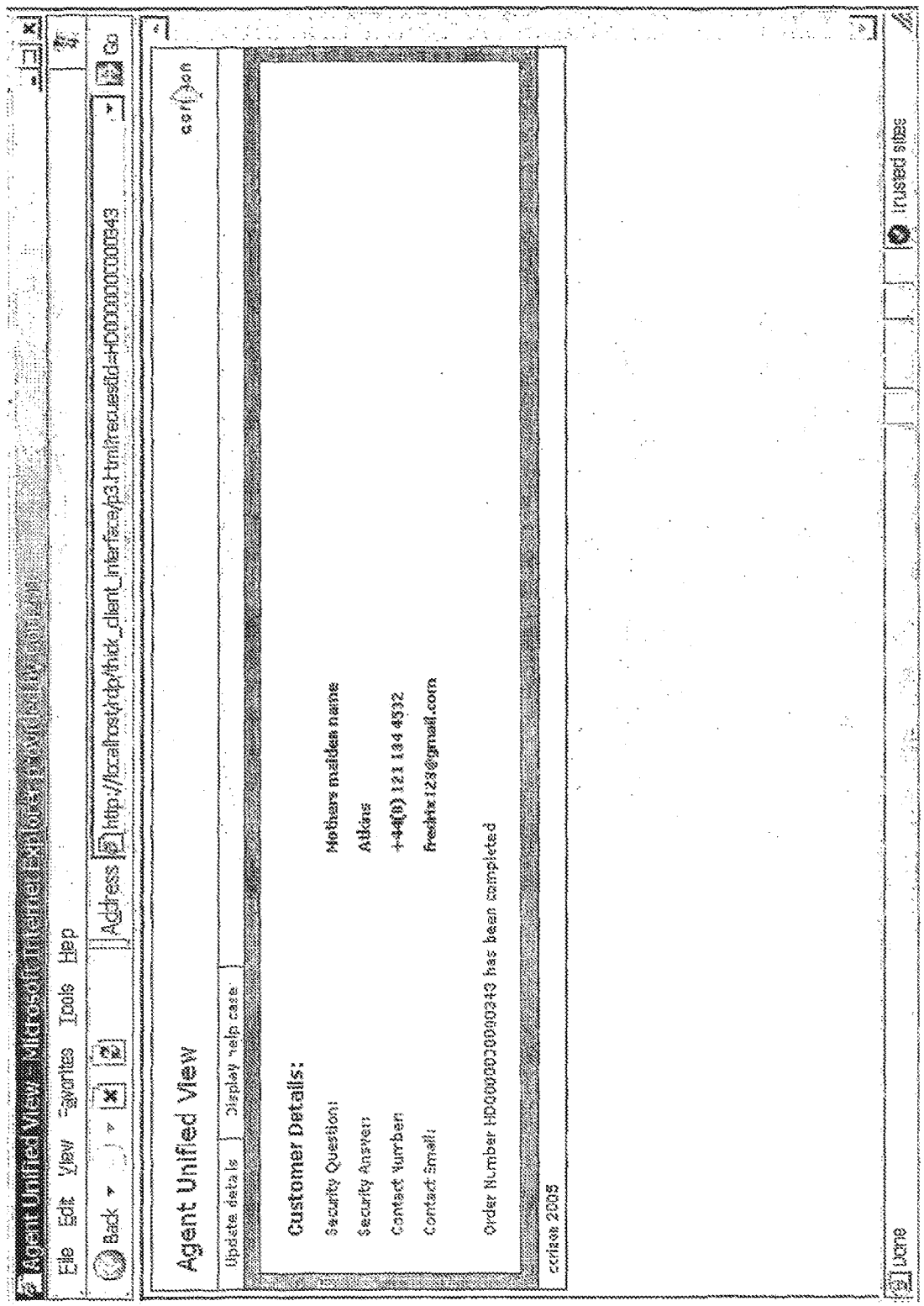

Having selected the submit button 155, an interface as shown in FIG. 25B is displayed to the user. At this stage, communication between the client displaying the HTML page 21 and the source application 15 is established as described above. The agent 19 then interacts with the source application 15 to extract a portion of the interface shown in FIG. 24A for display at the client computer. This is shown in FIG. 25C where it can be seen that a portion 156 of the interface of FIG. 24A is now included within the target interface. Additionally, referring to FIG. 25D, it can be seen that when the button 151 is selected from the target interface, the dialog box displayed has been modified. Specifically, its title bar has been removed, and an OK button 157 has been greyed out, so as to prevent changes to the summary being made. Selecting a Submit button 158 from the interface shown in FIG. 25C causes the interface of FIG. 25E to be displayed.

FIGS. 24 and 25 therefore show how, using an architecture shown in FIG. 4 and techniques such as those described above, a source applications interface can be modified and reused within a target application.

Alternative exemplary embodiments of the present invention are now described. In particular, embodiments using interpreters to modify application behaviour at runtime are now described. An interpreter can affect operation of the user interface in a variety of different ways. For example, the interpreter may interpret commands which make calls to functions provided by the user32.dll library, these function calls affecting operation of the user interface. Although such a technique can be effective, it requires that scripts are written which refer to appropriate elements of the user interface, such that function calls can include handlers for the appropriate user interface elements. Techniques are therefore required to obtain such handlers, and appropriate techniques are described in further detail below.

In some embodiments of the invention, changes required are implemented by overriding functions provided the user32.dll library associated with the source application instance 15. When this is done, at run time, modified behaviour is provided by the overridden function in place of the usual behaviour of the function provided by the user32.dll library. For example, if it is required that a window of the user interface is generated so as to have a different appearance, the CreateWindow function may be overridden, so as to provide a modified function which is called to create the window which is to be created in a modified manner. When carrying out such overriding (as is described below), it is important to ensure that the originally provided function is preserved, given that this originally provided function may need to be used for other elements of the user interface. A suitable technique for carrying out such overriding is described with reference to FIGS. 26A to 26C.

Figures 26A, 26B:
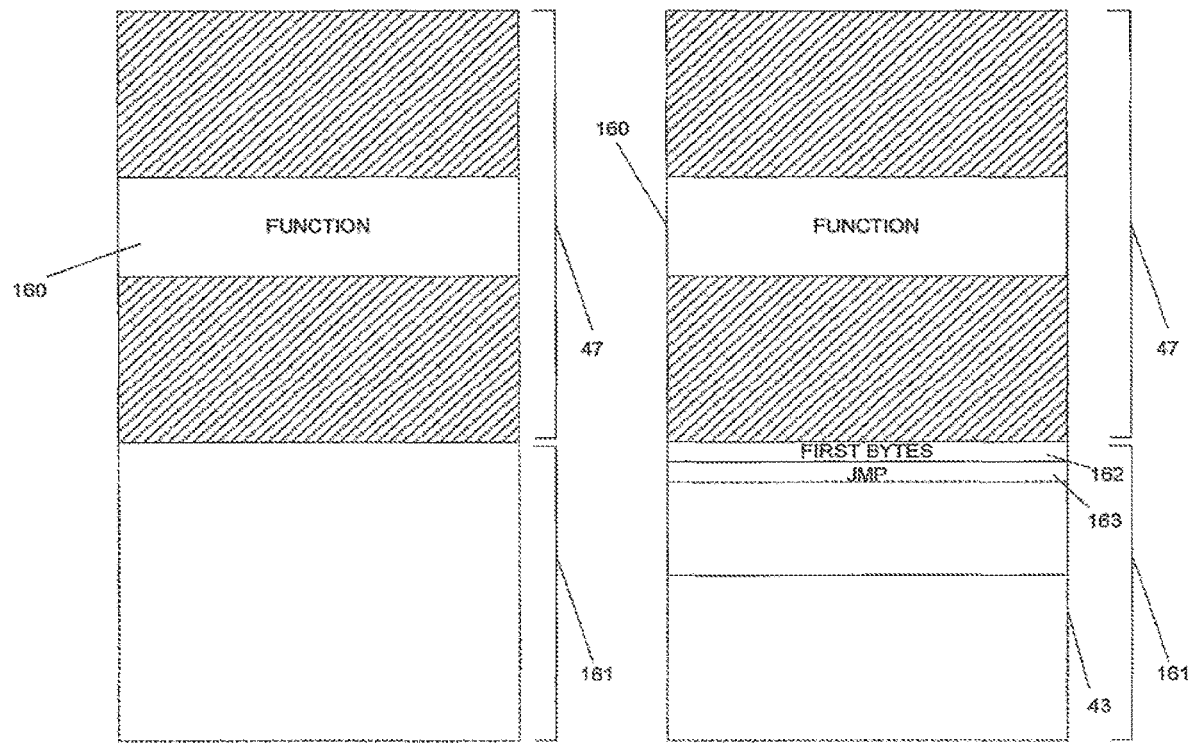
FIGS. 26A to 26C are schematic illustrations showing stages of a process for code-level modification of a user interface used in an embodiment of the present invention.
Figure 26C:
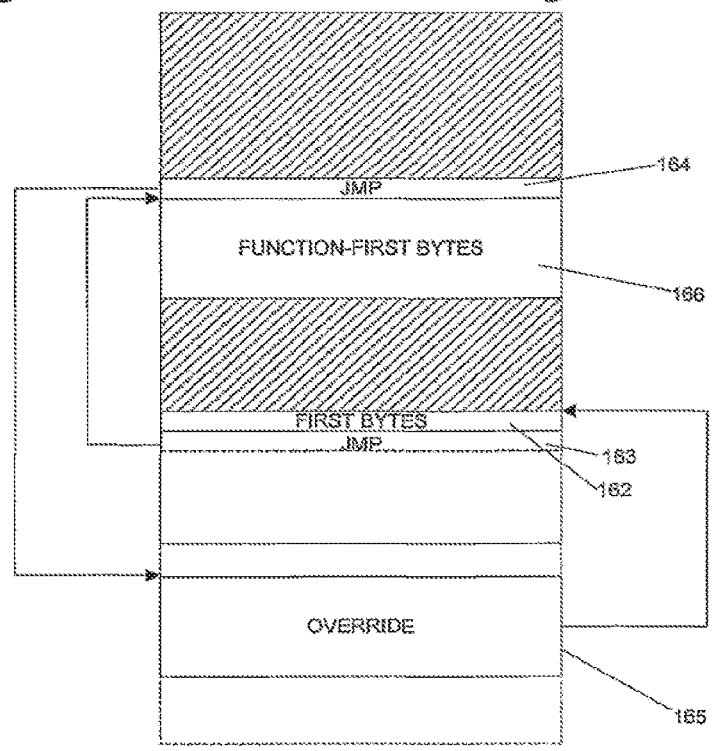

FIG. 26A shows the portion of memory 47 which stores the user32.dll library within the memory space of the source application 15. It can be seen that the portion of memory 47 includes program code for a function 160 which is to be overridden. FIG. 10 further shows a portion of memory 161 which is part of the memory space 43. The portion of memory 161 is currently storing no data required by the source application instance 15. Although the portions of memory 47, 161 are shown as being contiguous in FIG. 26A, it will be appreciated that in practice this need not be the case.

As previously described, the start address of the portion of memory 47 will be known given that the user32.dll library is always stored within an application process's memory space at a predetermined offset. Given that the agent 19 operates within the source application 15, the start address of the memory space of the process will be known. Given this start address and knowledge of the predetermined offset, the start address of the portion of memory 47 can be computed. Similarly, the start address for the function 160 can be computed.

The overriding used by the present invention operates by replacing code at a predetermined address associated with a function with code configured to carry out overriding. Thus when a function call is made at runtime (by redirecting control to the address associated with the function), code configured to carry out overriding is executed.

In order to implement the required overriding, it is necessary to replace a sufficient number of bytes of the function 160 (referred to as the "first bytes") with a jump (JMP) instruction, such that when the source application instance 15 calls the function 160, the JMP instruction is executed, so as to cause code configured to carry out overriding to be executed. It will be appreciated that the number of bytes required to represent a JMP instruction will determine a minimal number of first bytes, although the number of first bytes will need to be selected so as to end at an instruction boundary.

As described above, the first bytes of the function 160 are to be overwritten by a JMP instruction. In order to preserve operation of the function 160, before such overwriting, the first bytes which are to be overwritten are copied into a portion of memory 162, as shown in FIG. 26B. The copy of the first bytes is immediately followed by a JMP instruction 163 directing control back to the function 160.

Having copied the first bytes of the function 50 into the portion of memory 162, the first bytes are replaced by a JMP instruction 164 as shown in FIG. 10C. The JMP instruction 164 has as its target a portion of memory 165 which stores code configured to carry out the overriding described above. This will leave a block of code 166, which is the function 160 after removal of the first bytes. Program code within the portion of memory 165 is described in further detail below, although it should be noted that in general terms this code will check whether overriding is appropriate. If overriding is not appropriate, a JMP instruction will direct execution to the first bytes 162, from where the JMP instruction 163 will direct control back to the code 166, thus providing functionality of the function 160.

Care must be taken when generating the code 165 configured to carry out the overriding. In particular, it should be noted that, at runtime, control will be directed to the code 165 immediately after a call to the function 160 has been made. Thus, the operating system call stack will contain parameters for the function 160, and it is thus necessary to ensure that the code 165 appropriately interprets these parameters.

Figure 27:
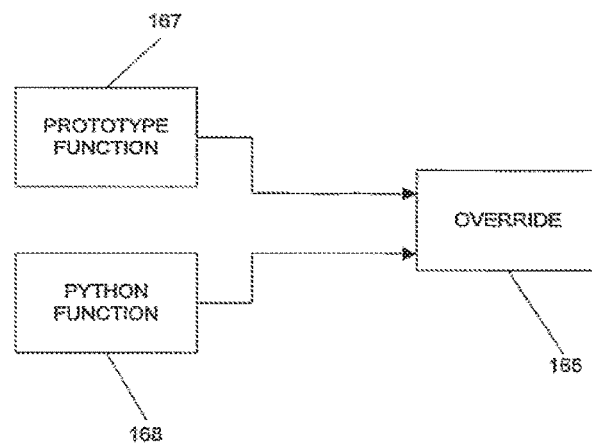
FIG. 27 is a schematic illustration of a process for generating modification code used in the process of FIGS. 26A to 26C.

A method for generating the code 165 is now described with reference to FIG. 27. In a high level scripting language such as a Python, a function prototype 167 for the function 160 is created. Additionally, a Python function 168 which is to be used to generate the code 165 is created. Having created the function 168, standard python techniques are used to associate the function 168 with the function prototype 167, thus generating the code 165.

As indicated above, it is likely that the code 165 will first check whether the call made requires the overridden version of the function, and if not, the original version of the function 160 will be used. If this check determines that something more than simply a call to the original function 160 is required this is carried out by the code 165, generated from the Python function 168. The additional operations required can take a wide variety of forms. For example, it may be desired to suppress operation of the function completely. That is, where the function 160 is the CreateWindow function, the code 165 may determine the window with which the function call is associated from parameters on the call stack. A check can then be carried out to determine whether the operation should be suppressed for that window. If this is the case, the suppression would prevent the window being displayed, thereby causing the user interface to be modified.

Figures 28, 29:
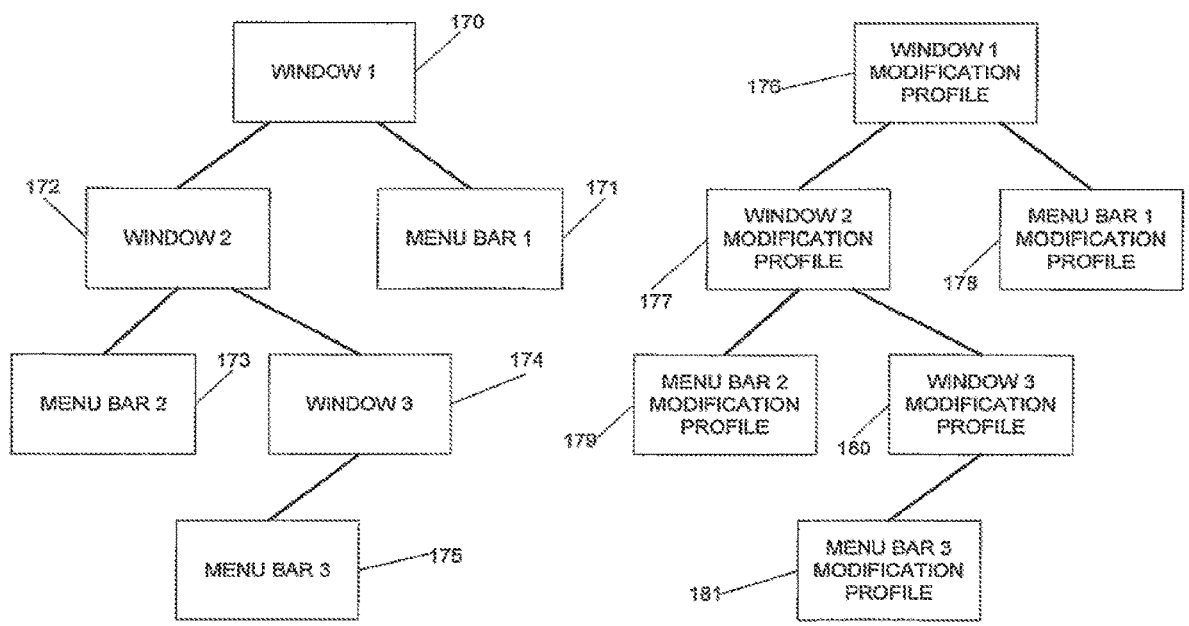
FIG. 28 is a schematic illustration of a hierarchy of user interface elements.
FIG. 29 is a schematic illustration of a hierarchy of modification profiles associated with the user interface elements of FIG. 28.

It has been described that embodiments of the invention make modifications to various elements of a user interface. Identification of these elements, and modelling of necessary modifications is now described. FIG. 28 is a schematic illustration of a hierarchy of user interface elements making up a user interface which is to be modified in an embodiment of the invention. It can be seen that the user interface comprises a top level window 170 which comprises two child elements. These child elements are a menu bar 171 and a sub window 172. The menu bar 171 has no child elements, while the sub window 172 has two child elements of its own, specifically a menu bar 173 and a further sub window 174. Again, the menu bar 173 has no child elements while the further sub window 174 itself has a single child element in the form of a menu bar 175.

Details of the hierarchy of user interface elements shown in FIG. 12 can be obtained from the relevant source application without difficulty. Such details can be obtained either manually or using a computer program. FIG. 29 is a schematic illustration of a model used to represent the user interface shown in FIG. 28, and to model necessary modifications of that interface. It can be seen that each of the user interface elements shown in FIG. 28 has a corresponding modification profile in the model of FIG. 29. Specifically, a first modification profile 176 has two associated child profiles 177, 178. The modification profile 176 represents the window 170, while the modification profile 177, 178 respectively represent the sub window 172 and the menu bar 171. The modification profile 177 itself has two child modification profiles 179, 180 respectively representing the menu bar 173 and the window 174. The modification profile 180 itself has a child modification profile 181 representing the menu bar 175.

Figure 30:
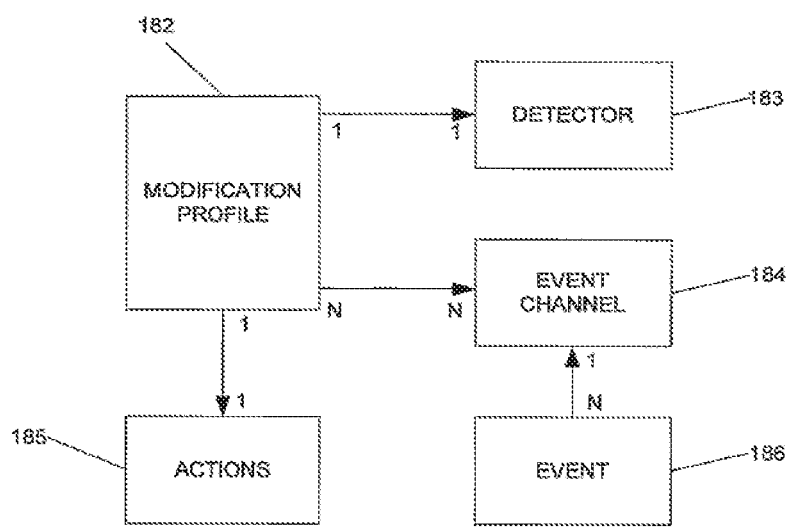
FIG. 30 is a schematic illustration of classes used to provide the modification profiles shown in FIG. 28.

The modification profiles shown in FIG. 29 represent modifications which are required to the interface of a source application as described above, so as to provide a user interface for display to a user of the PC 3. These modification profiles are now discussed in further detail with reference to FIG. 30. FIG. 30 is a class diagram showing how object orientated classes are used in the modelling process. It can be seen that a modification profile class 182 has relationships with a detector class 183 and an event channel class 184. The modification profile class 182 also has relationships with an actions class 185. It can be seen from FIG. 30 that events being instances of an event class 186 are sent on an event channel represented by an instance of the event channel class 184.

It will be appreciated that the model represented by FIG. 29 is in fact represented by a plurality of instances of the modification profile class 182. Each of these instances of the modification profile class 182 will have associated instances of the other classes shown in FIG. 30 as is described in further detail below.

Figure 31:
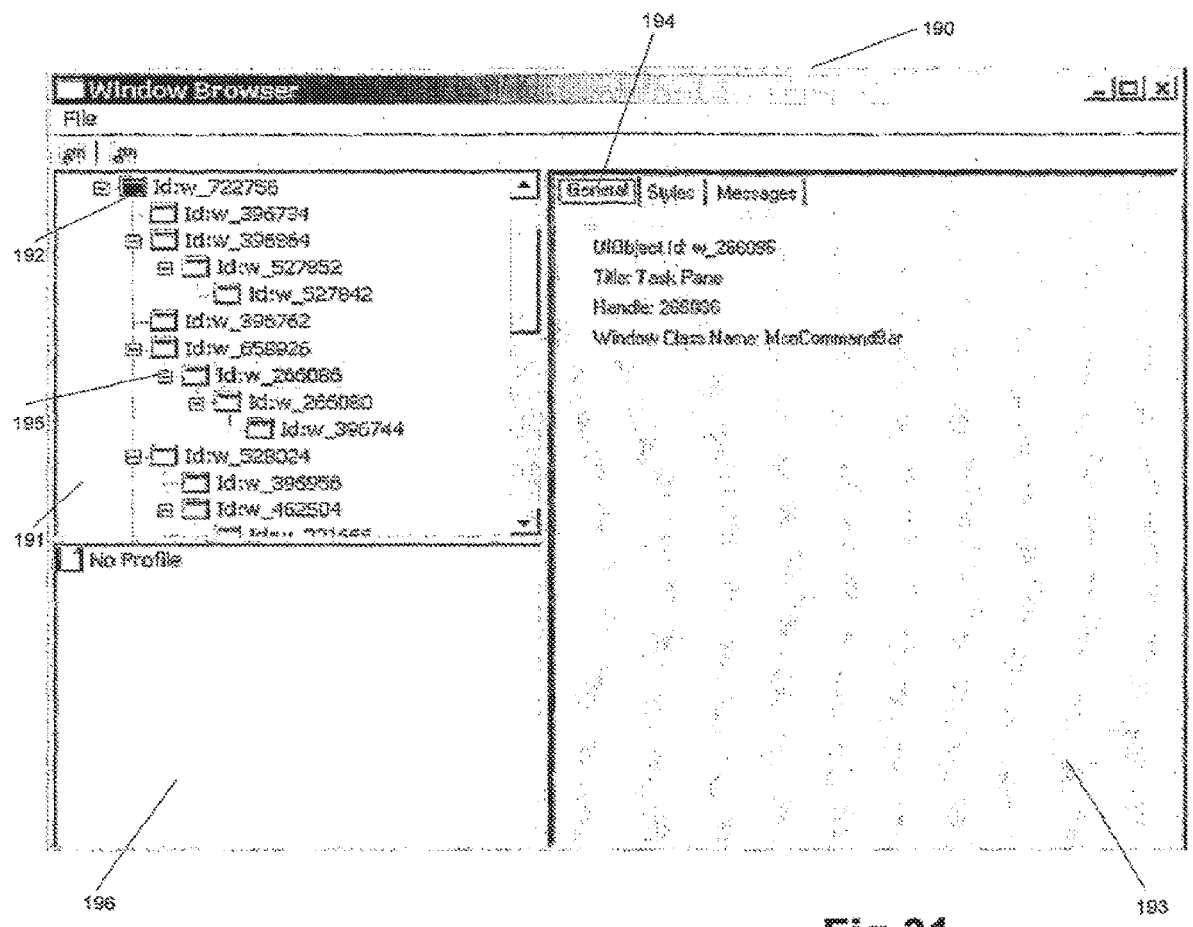
FIGS. 31 to 36 are screenshots taken from an application configured to generate modification profiles such as those illustrated in FIGS. 29 and 30.

A description of a computer program configured to create and configure instances of the classes shown in FIG. 30 is now described with reference to the screenshots of FIGS. 31 to 36. The application associated with the screenshots of FIGS. 31 to 36 is run from the interpreter described above which runs as a thread within a source application process. Components of the user interface are now described. The user interface comprises a window 190 comprising three panes. A first pane 191 represents a hierarchical view of elements of the user interface of interest. For example, it can be seen that a top level user interface element 192 comprises a plurality of other user interface elements, some of which themselves have child user interface elements. A second pane 193 comprises three tabs. A general tab 194 is shown in FIG. 31. The general tab 194 displays information such as an object id, title and handle for a user interface element 195 highlighted in the first pane 191. Additionally, the general tab 194 includes details of a class name which is used to implement that user interface 3; element. A third pane 196 of the window 190 contains details of a modification profile associated with the user interface element 195 highlighted in the first pane 191. In the screenshot of FIG. 31, it can be seen that no modification profile is associated with the highlighted user interface element 195.

Data to be included within the first pane 191, and the second pane 193 of the window 190 is obtained by the code running within the interpreter, and is used to populate the user interface.

Figure 32:
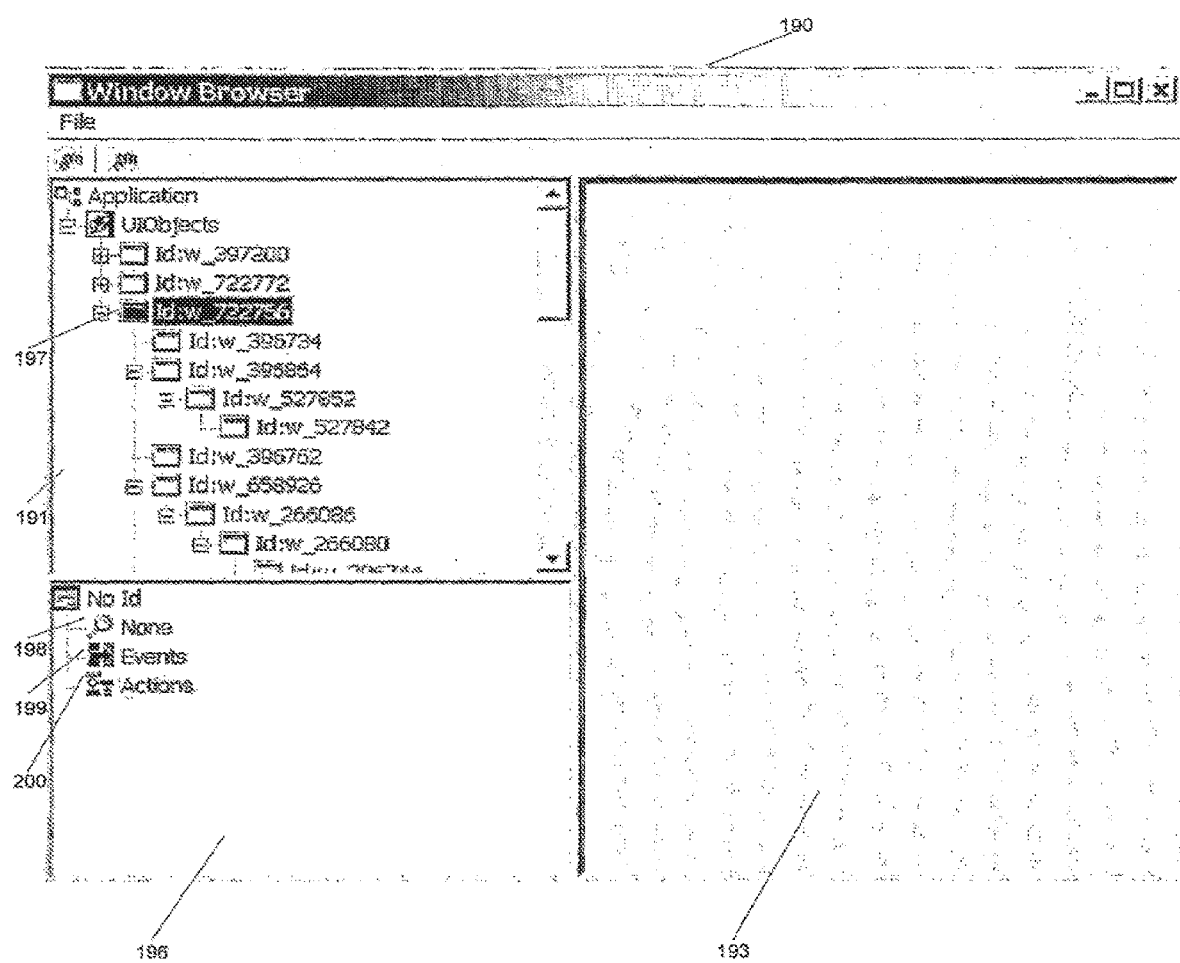

Referring now to FIG. 32, a further screen shot of the window 190 is shown. It can be seen here that within the first pane 191 a user interface element 197 is highlighted. By making appropriate menu selection (for example from a menu displayed when a user clicks a right mouse button over the user interface element 197) a modification profile for that object is created, details of which are shown in the third pane 196. It can be seen that the modification profile includes three elements. Specifically, the modification profile includes identification data 198, event data 199, and action data 200. The identification data 198 indicates data associated with a detector object 183 (FIG. 30) indicating how the user interface associated with the modification profile is to be identified.

Figure 33:
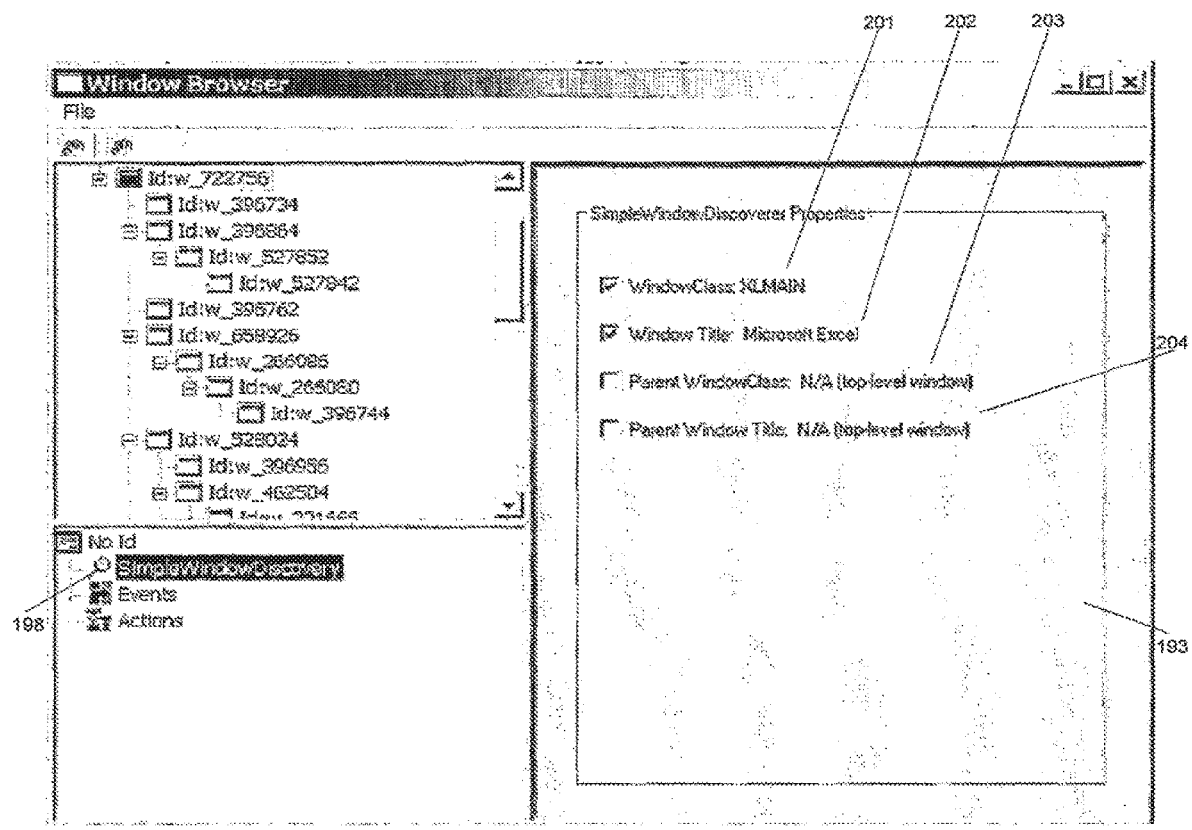

FIG. 32 shows a situation where no detector object is yet defined. However, by selecting the identification data 198, a suitable detector object can be created. Thereafter, when the identification data 198 is selected, the pane 193 displays details of the associated detector object. This is shown in FIG. 33. It can be seen that various criteria which can be used to identify a user interface element are shown. Specifically, a user interface element can be identified by its class 201, its title 202, its parent window class 203, or its parent window title 204. Each of these properties has an associated tick box, and selection of the tick box will cause configuration of the associated detector object, so as to cause detection to make use of the appropriate parameter. Data shown in the pane 193 in FIG. 33 is stored within an appropriate instance of the detector class as described above.

Figure 34:
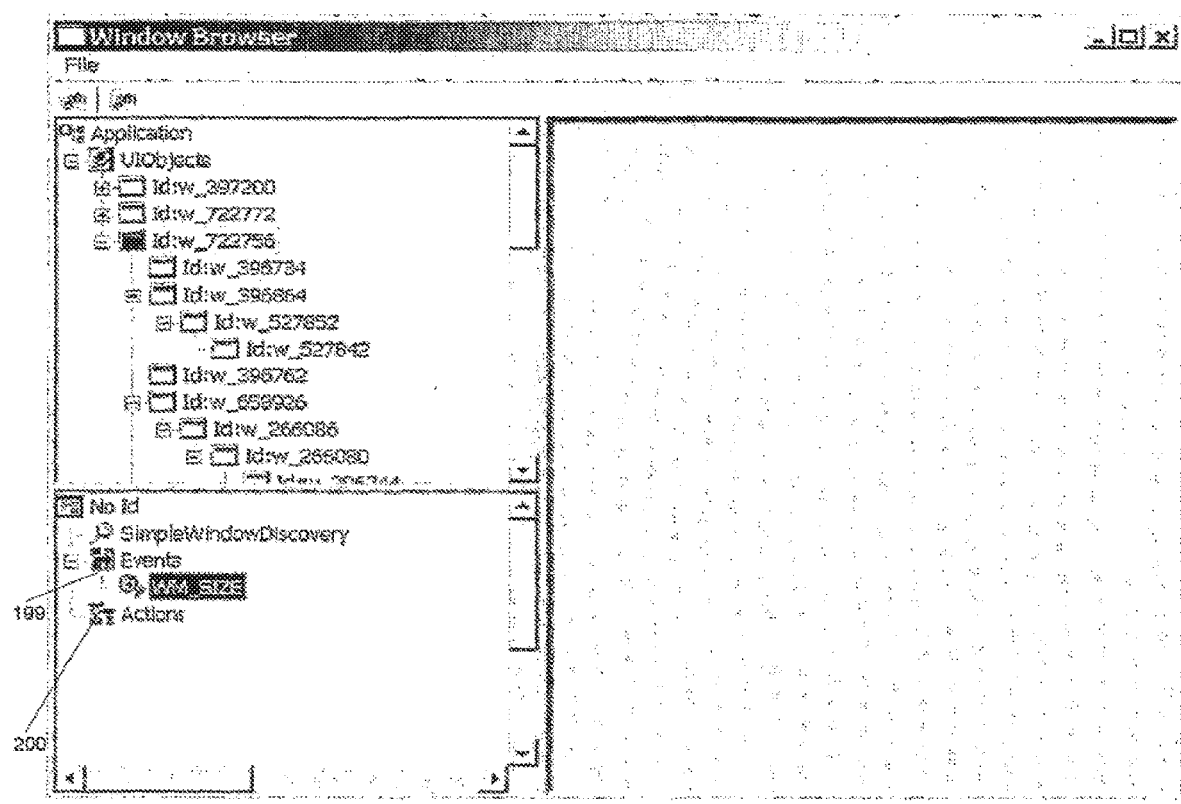

It will be appreciated that modification of a source application user interface will need to be carried out at runtime in response to particular events. For this reason, as shown in FIG. 34, it is possible to specify event data 199 to be associated with a particular user interface element. This associates a particular event channel with the modification profile. More specifically, a particular instance of the event channel class 184 will be associated with the appropriate instance of the modification profile class 182. Thereafter, events generated and transmitted on the appropriate event channel instance will be provided to the modification profile. Such events will typically have associated actions as represented by the actions data 200. These actions will define modifications which are required to the user interface data in response to the events. The event passing and event handling mechanism used in a preferred embodiment of the invention is described in further detail below.

Figure 35:
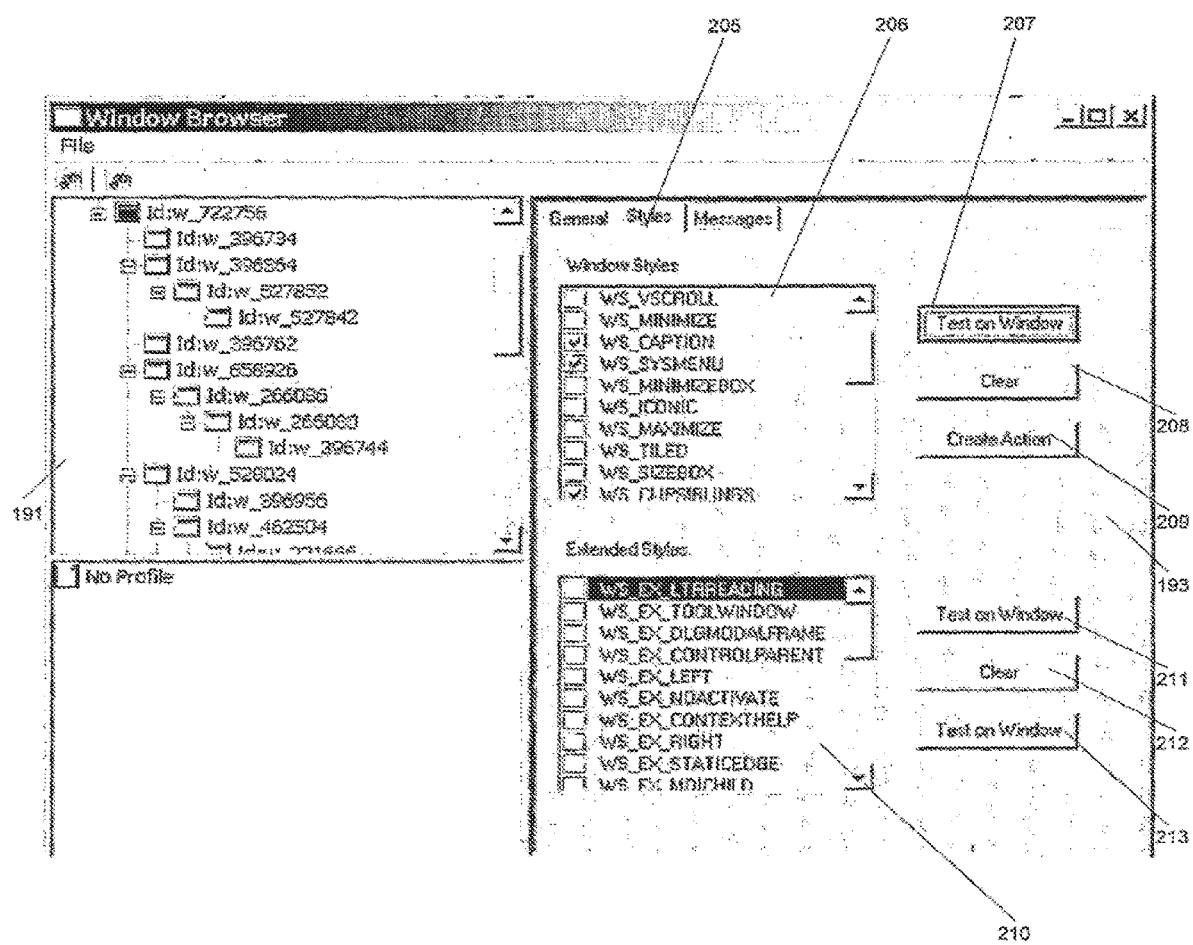
Figure 36:
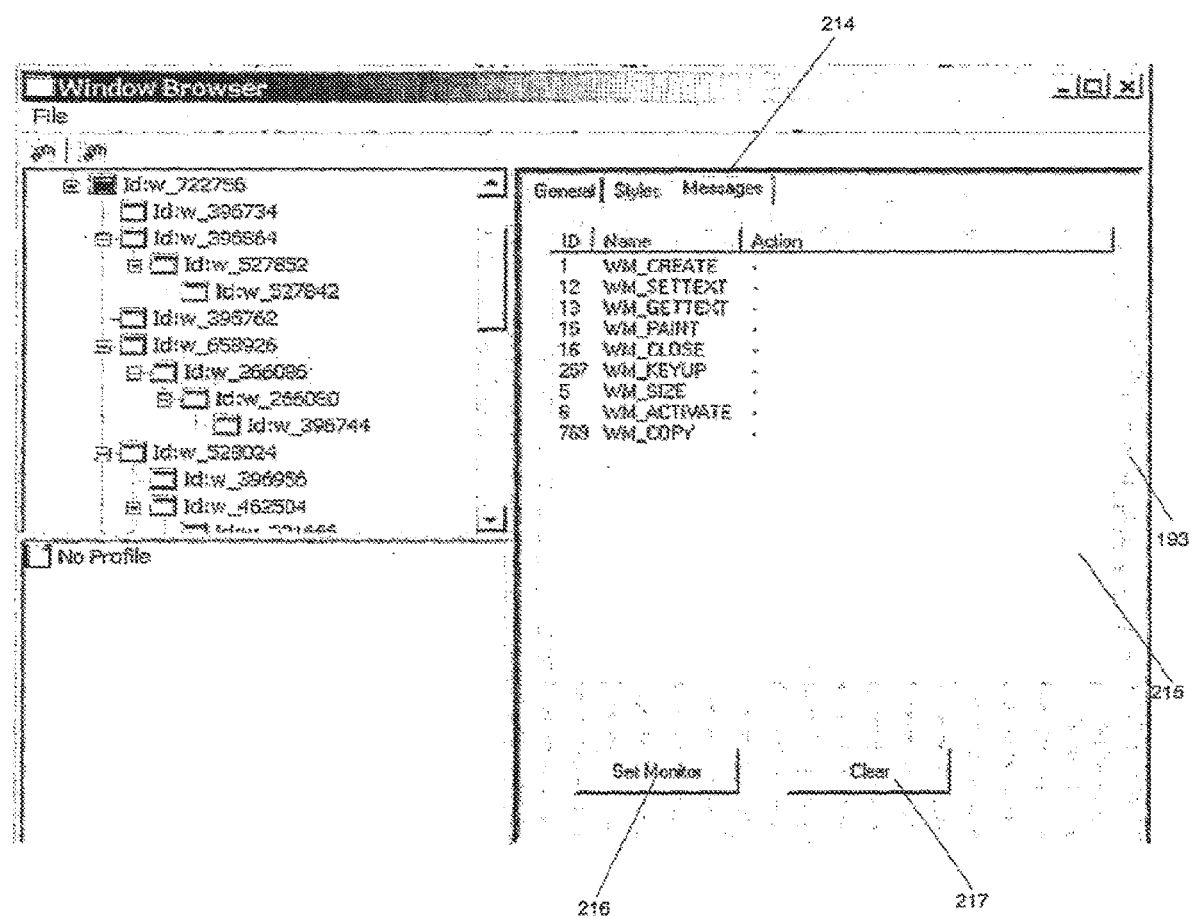

Referring now to FIGS. 35 and 36, others of the tabs provided in the pane 193 in connection with a particular user interface element highlighted in the pane 191 are described. In particular, a styles tab 205 is shown in FIG. 35. It can be seen that the styles tab 205 includes a scrollable list of window styles 206 which may be selected by a user using appropriate tick boxes provided within the scrollable list 206. The scrollable list 206 has three associated buttons. Window styles are specified within the scrollable list 206, and a button 207 is then be selected so as to apply the selected styles to the window of the user interface of the source application, such that a user can verify that the selected style is that which is required in use. A second button 208 is used to clear window styles selected by the user and applied using the first button 207 from the user interface of the source application. A third button 209 allows an action to be created so as to generate a window having the style specified in the scrollable list 206. Having generated such an action, that action can be associated with an event of the type described above. Thus, the portion of the styles tab 205 described above allows a user to experiment with window styles by selecting styles from the scrollable list 206 and using the first and second buttons 207 and 208. When appropriate styles have been selected to a user's satisfaction, the third button 209 can then be used to create an action so as to apply these styles in use when particular events occur.

The tab 205 further comprises a second scrollable list 210 which has three associated buttons 211, 212, 213. The scrollable list 210 allows extended windows styles to be specified, and operates, along with the buttons 211, 212, 213 in a manner analogous to that of the scrollable list 206 and the buttons 207, 208, 209.

FIG. 36 shows a messages tab 214 of the pane 193. The messages tab 214 includes an area 215 which details messages which are associated with the user interface element currently being manipulated. A message within the area 215 can be selected, and a set monitor button 216 can then be used so as to monitor all occurrences of such messages. Such monitoring can be carried out by an appropriate action. A clear button 217 clears message monitoring.

From the preceding discussion, it will be appreciated that the user interface described with reference to FIGS. 31 to 36 can be used to analyse a user interface and to associate particular actions with particular events associated with that user interface. That is, the methods described above can be used so as to trigger particular actions on the occurrence of particular events. Events of interest may occur either within the source application 15, or within the interface 22 provided to a user of the client PC 3 within the HTML page 21. As described above, the agent 19 monitors for occurrences of particular events and then takes appropriate actions. In order to allow this to happen, events occur which at the client PC 3 are transmitted by the browser agent 23 via the TSAC to the agent 19. Indeed, the agent 19 models the client PC 3 as an object, and therefore treats events occurring at the client PC 3 in the same way as events occurring within the source application 15. The communications channel established between the browser agent 23 and the agent 19 (via the TSAC 24) allows events to be passed in both directions. That is, the browser agent 23 may also process events and take appropriate actions at the client PC 3. Indeed, both the agent 19 and the browser agent 23 listen for events of interest (as specified, for example, using the user interface of FIGS. 31 to 36) and take appropriate action. In some cases, events detected by either the agent 19 or the browser agent 23 may simply require an action in terms of event transmission to the other of the browser agent 23 and the agent 19.

The preceding discussion has described how the client PC 3 and the server 1 may communicate so as to provide a user interface taken from a source application running at the server 1, to a user of the client PC 3. The description has also described how elements of that user interface may be modified. However, in some embodiments of the invention it is desired that an interface comprising user interface elements taken from a plurality of source applications are provided to a used of the client PC 3. A suitable architecture for implementing such an embodiment of the invention is shown in FIG. 37, where like reference numerals are used to refer to components shown also in FIG. 4.

Figure 37:
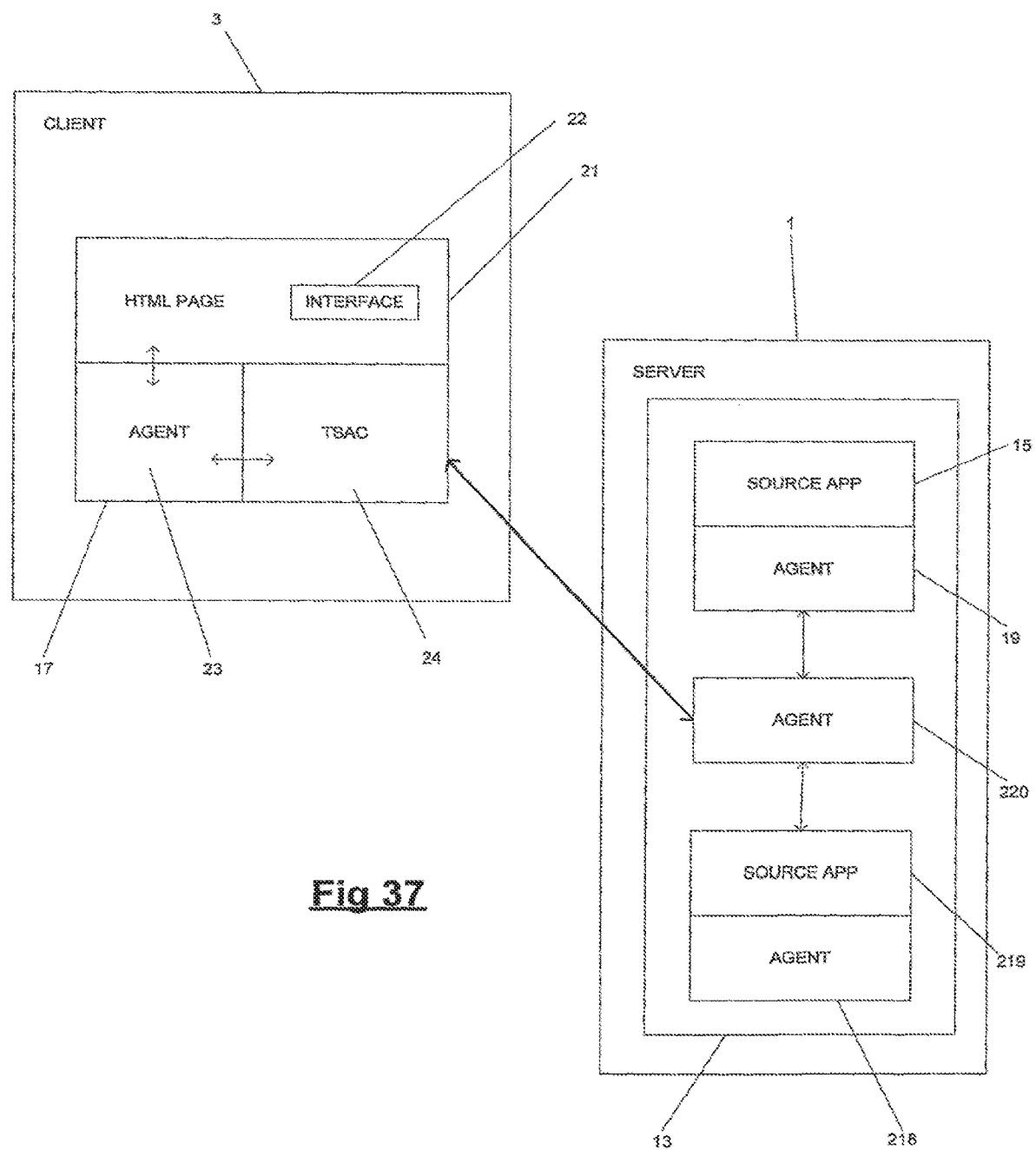
FIG. 37 is a schematic illustration of an architecture for implementing an embodiment of the invention in which two source applications run on a server, to generate a user interface for presentation to a user.

Referring to FIG. 37, it can be seen that within the desktop session 13 run on the server 1, in addition to the source application 15, a further source application 218 is also run. Typically, the source application 219 will be different from the source application 15. The source application 219 has an associated agent 218, which functions analogously to the agent 19 associated with the source application 15. That is, the agent 218 will typically run within a thread within the process of the source application 219. Additionally, within the desktop session 13, an agent 220 is provided which communicates with the agent 218 associated with the source application 219 and the agent 19 associated with the source application 15. In the embodiment shown in FIG. 37, the agent 220 communicates with the browser agent 23 via the TSAC 24. The agent 220 runs as a separate process within the desktop session 13 and is configured to communicate with the agents 19 and 218 so as to provide data to the browser agent 13 required to generate the interface 22.

Figure 38:
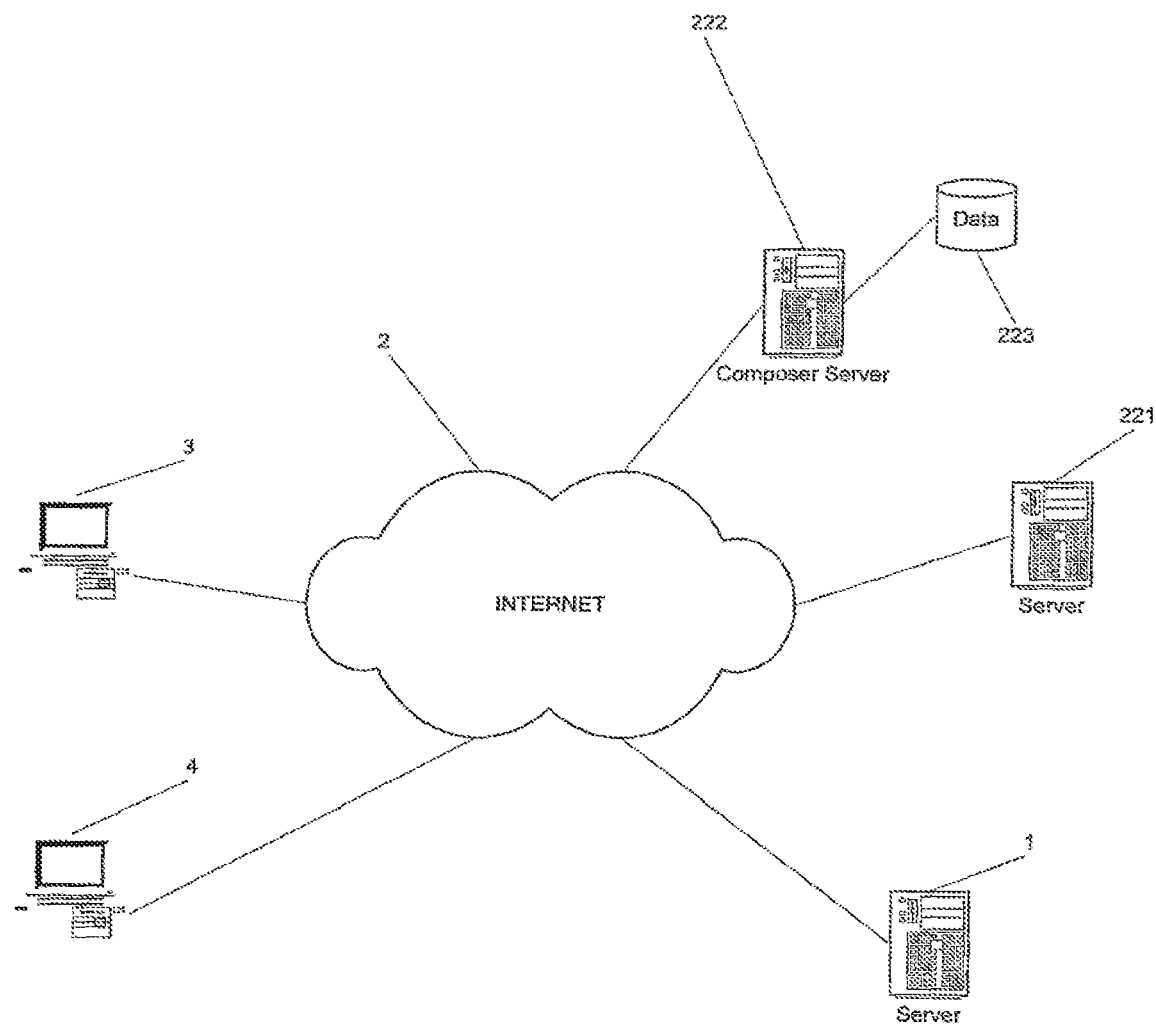
FIG. 38 is a schematic illustration of an embodiment of the present invention in which a plurality of source applications are run on different servers, to generate a user interface for presentation to a user.

Referring now to FIG. 38, an alternative embodiment of the invention is described. Here, it can be seen that again the server 1, and the PC's 3, 4 are connected to the Internet 2. However in the embodiment of FIG. 22, a server 221 is also connected to the Internet 2 as is a composer server 222. Again, the PC's 3 and 4 are configured so as to provide a user interface to respective users, the user interface being generated from elements of source applications provided by appropriate source application servers. In this case, the interfaces provided by the PC's 3, 4 are provided using user interface elements taken from applications running both on the server 1 and the further server 221. However, it should be noted that there is no direct communication between the server 1 and the PC's 3 and 4, and similarly there is no direct communication between the server 221 and the PC's 3 and 4. Rather, the PC's 3, 4 communicate with the composer server 222 which has associated composition data 223. Requests received by the composer server 222 then result in user interface elements being requested from source applications running on the server 1, and the server 221. Such user interface elements are obtained at the server 1 and the server 221 using agents of the type described above. User interface elements so obtained are combined by at the composer server 222 so as to generate interfaces for display to users of the PC's 3, 4.

Figure 39:
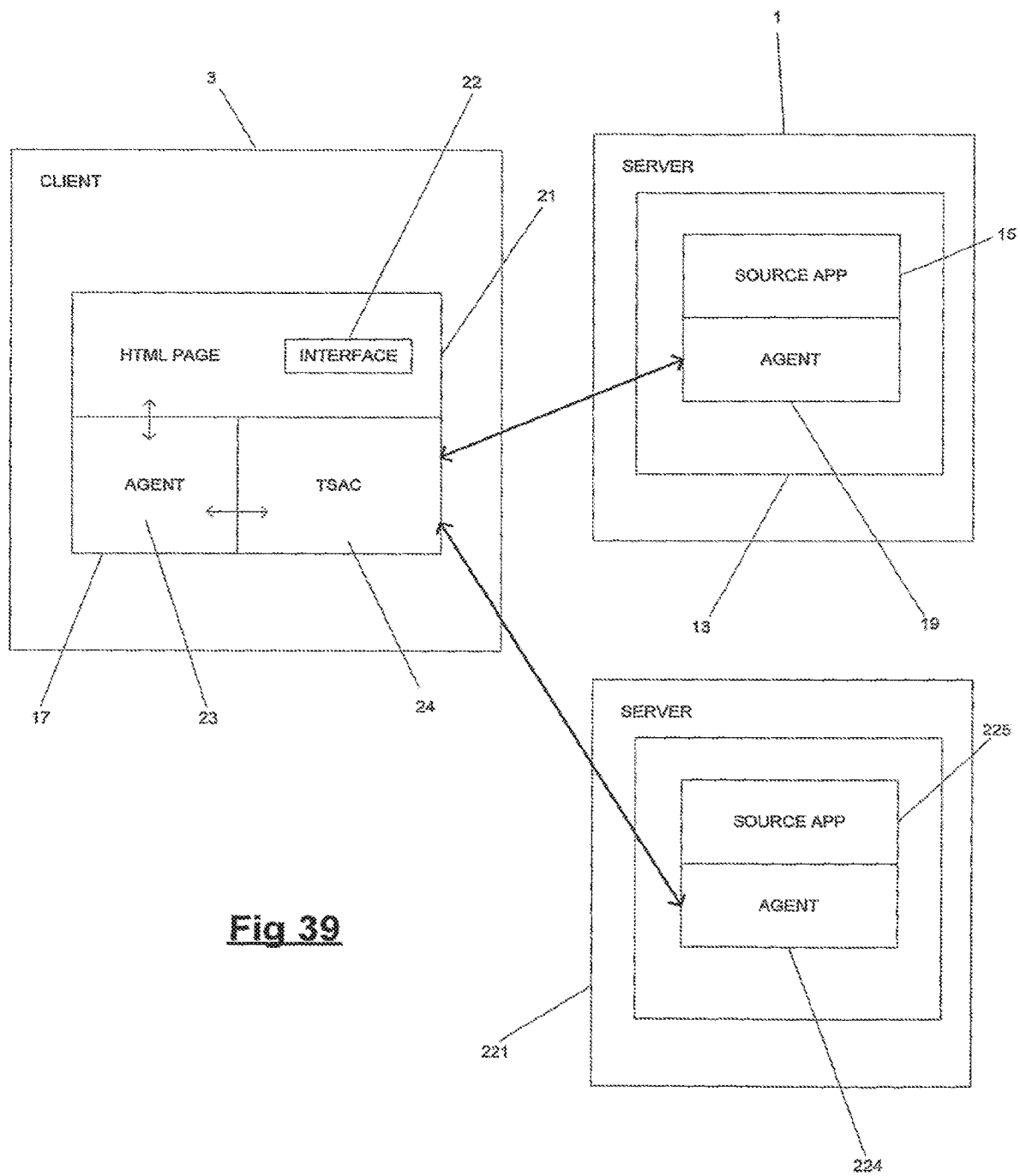
FIG. 39 is an alternative embodiment of the invention to that illustrated in FIG. 37.

FIG. 39 shows yet another embodiment of the invention. Here, the client PC 3 communicates directly with the server 1 and the server 221 via the Internet (not shown). That is, the browser agent 23 is configured to communicate directly with the agent 19 associated with the source application 15 running on the server 1 as well as an agent 224 which is associated with a source application 225 running on the server 221. In embodiments of the invention shown in FIG. 39 it will be appreciated that the browser agent 23 must be provided with means so as to combine user interface data received both from the server 1 and the server 221 so as to generate a user interface for display to a user.

It will be appreciated that the source applications referred to above may take any one of a number of different forms. For example, on the Microsoft Windows Operating system, applications likely to be encountered include 32-bit third party applications, 16-bit legacy applications, DOS based applications, emulators, browser based applications and Java applications.

32-bit third party applications are in general relatively easy to manipulate in the manner described above. When such applications are used, user input events are likely to be relatively easy to handle. However user interface events are likely to depend upon the development tools used to develop the user interface. That is, knowledge of the manner in which the application was developed is likely to be beneficial when handling user interface events associated with such applications. 16-bit legacy applications are likely to be harder to manipulate, given different and less accessible event handling mechanisms.

Browser based applications are now reasonably widespread. Such applications provide interfaces by way of a series of pages displayed in a web browser. Interfaces provided by means of HTML pages can be relatively easily manipulated using known techniques. The applicant's published International Patent Application Publication No. WO2005/062175 which is herein incorporated by reference, describes suitable techniques. When more complex techniques are used to implement user interfaces, techniques to manipulate code at run-time such as those described above, may be effectively used. Techniques requiring such manipulation include applets, activeX Controls and Macromedia Flash content used to provide user interfaces. Java applications may be relatively easily manipulated, given that they are likely to use well defined windowing toolkits, such as the abstract windowing toolkit (AWT) or Swing.

In addition to the applications described above, it should be noted that some applications are generated automatically from predefined data. Such applications may include interfaces which have dynamically changing controls, or dynamically changing control names, requiring special processing. It should be noted that the modification techniques operative at runtime described above can in general be used to affect the operation of dynamically altered user interface elements. Additionally, some 32-bit applications render all user interface elements within the application (that is, they do not use user interface libraries or toolkits to obtain user interface elements).

Although a preferred embodiment of the present invention has been described above, it should be noted that the invention can be carried out in a variety of different ways. For example, when manipulating a user interface of a source application, various techniques can be used. These include using an already exposed application programmer's interface (API) which allows the user interface to be manipulated.

Alternatively, where no such API is exposed, an operating system messaging layer can be used to expose an API for use. Such an approach requires a library to be provided for each type of component which is to be manipulated.

In some embodiments, COM objects used to create the user interface can be used to enable manipulation of the user interface. Alternative techniques include the use of analysis of a rendered user interface at pixel level, and use of this analysis to cause appropriate modification.

The modifications to be carried out to the interface of one or more source applications can include reuse of all or part of a user interface, disabling and making invisible parts of the user interface, changing operation of user interface elements, combination of user interfaces provided by different source applications and rearrangement of user interface elements to meet particular usability requirements. The implementation of such modifications will be readily understood by one of ordinary skill in the art.

Embodiments of the invention described above use ActiveState Python version 2.4.1 and version 0.9.6 of the c types module.

Although specific embodiments of the invention have been described above, it will be appreciated that various modifications can be made to the described embodiments, without departing from the spirit and scope of the present invention. In particular, where references have been made to particular computer programming languages or operating systems, it will be appreciated that other programming languages and operating systems could be used in alternative embodiments of the invention.

Furthermore, it will be appreciated that although the embodiments described relate to modification of user interfaces, other modifications to applications are also contemplated, and fall within the spirit and scope of the invention.

The invention claimed is:

1. A method of modifying behavior of a user interface comprising a plurality of user interface elements, the method comprising:
   performing by a computer system programmed with code stored in a memory and executing by a processor of the computer system to configure the computer system into a machine for:
      detecting an event representing activity with the user interface at a communicating object representing one of a plurality of communicating objects, wherein a model of the user interface is defined using the plurality of communicating objects;
      receiving, via a message bus, a notification of occurrence of the detected event that indicates the activity associated with the event;
      processing the notification of the event detected at one of the plurality of communicating objects to determine a modification from a first behavior of a first function of a first application computer program associated with the communicating object to a second behavior of a second function of the first application computer program in response to the detected event to modify the user interface, wherein processing the notification of the event comprises:
         copying a portion of the first function of a first application computer program to be modified from a first memory location to a second memory location and adding a return call in the second memory location to after the first memory location to return to the first application computer program after modifying behavior of the user interface;
         replacing the copied portion of the first application computer program with a function call located within the first memory location, wherein the function call is to the second function to modify the user interface with the second behavior;
         executing the function call to the second function to replace the first function with the second function in response to the detected event;
         executing the second function;
         modifying the behavior of the user interface from the first behavior to the second behavior in accordance with the executed second function;
         returning to the portion of the first application computer program copied to the second memory location; and
         executing the portion of the first application computer program copied to the second memory location to return control to the first application computer program copied to the first memory location.

2. The method of claim 1 wherein receiving, via a message bus, with an object of the model a notification of occurrence of the detected event further comprises:
   transmitting a message from the one of the objects to at least one further object in response to the event.

3. The method of claim 1, wherein at least some of the plurality of communicating objects have associated action objects, the action objects defining modification behavior of the model in response to the events.

4. The method of claim 1, further comprising:
   performing by the computer system programmed with code stored in the memory and executing by the processor of the computer system to configure the computer system into the machine further for:
      generating the user interface using the communicating objects.

5. The method of claim 4 further comprising:
   performing by the computer system programmed with code stored in the memory and executing by the processor of the computer system to configure the computer system into the machine further for:
      calling a predetermined function with the communicating object to generate the notification.

6. The method according to claim 5, wherein the predetermined function is called when a function associated with a predetermined user interface manipulation is called.

7. The method of claim 5, further comprising:
   performing by the computer system programmed with code stored in the memory and executing by the processor of the computer system to configure the computer system into the machine further for:
      modifying the object executing to provide the user interface to insert the function call to the predetermined function.

8. The method of claim 1, wherein the objects are implemented in an object orientated interpreted programming language running within an interpreter.

9. The method according to claim 8, further comprising:
   establishing a link between the user interface and the interpreter.

10. The method according to claim 8, wherein the predetermined function call calls a function provided by code running in the interpreter.

11. A data carrier carrying computer readable program code configured to cause a computer to carry out a method according to claim 1.

* * * * *